US011184833B2

United States Patent
Athlur et al.

(10) Patent No.: US 11,184,833 B2
(45) Date of Patent: Nov. 23, 2021

(54) BANDWIDTH SHARING AMONGST TRUSTED PEERS

(71) Applicant: Citrix Systems, Inc., Fort Lauderdale, FL (US)

(72) Inventors: Anudeep Narasimhaprasad Athlur, Bangalore (IN); Praveen Raja Dhanabalan, Bangalore (IN); Anuj Magazine, Bangalore (IN)

(73) Assignee: Citrix Systems, Inc., Fort Lauderdale, FL (US)

( * ) Notice: Subject to any disclaimer, the term of this patent is extended or adjusted under 35 U.S.C. 154(b) by 9 days.

(21) Appl. No.: 16/445,981

(22) Filed: Jun. 19, 2019

(65) Prior Publication Data

US 2020/0404573 A1 Dec. 24, 2020

(51) Int. Cl.
| | |
|---|---|
| H04L 29/08 | (2006.01) |
| G06F 17/30 | (2006.01) |
| G06F 11/34 | (2006.01) |
| G06F 11/30 | (2006.01) |
| H04W 40/34 | (2009.01) |
| H04W 76/14 | (2018.01) |
| H04W 12/033 | (2021.01) |
| H04L 9/32 | (2006.01) |
| H04W 4/06 | (2009.01) |

(Continued)

(52) U.S. Cl.
CPC .......... *H04W 40/34* (2013.01); *H04L 9/3213* (2013.01); *H04W 4/06* (2013.01); *H04W 4/12* (2013.01); *H04W 12/033* (2021.01); *H04W 12/06* (2013.01); *H04W 40/22* (2013.01); *H04W 76/14* (2018.02); *H04W 92/18* (2013.01)

(58) Field of Classification Search
CPC ..... H04W 40/34; H04W 76/14; H04W 40/22; H04W 12/0013; H04W 4/12; H04W 12/06; H04W 4/06; H04W 92/18; H04L 9/3213
USPC .......................................... 709/239
See application file for complete search history.

(56) References Cited

U.S. PATENT DOCUMENTS

| | | | | |
|---|---|---|---|---|
| 7,272,645 | B2 * | 9/2007 | Chang | H04L 29/06 |
| | | | | 709/203 |
| 8,149,771 | B2 * | 4/2012 | Khivesara | H04L 47/803 |
| | | | | 370/329 |

(Continued)

FOREIGN PATENT DOCUMENTS

| | | |
|---|---|---|
| WO | 2016048446 A1 | 3/2016 |
| WO | 2016161366 A1 | 10/2016 |

OTHER PUBLICATIONS

International Search Report and Written Opinion dated Jun. 7, 2020 for International Application No. PCT/US2020/029705.

*Primary Examiner* — Moustafa M Meky
*Assistant Examiner* — Elizabeth Kassa
(74) *Attorney, Agent, or Firm* — Pierce Atwood LLP

(57) ABSTRACT

A first device connected to a network via a first connection may perform a method that involves determining a need for improved communication between the first device and the network, receiving a message from a second device that includes an indication of at least one performance parameter of a second connection between the second device and the network, establishing a peer-to-peer connection between the first device and the second device based at least in part on the indication, and communicating with the network via a communications channel that includes the peer-to-peer connection and the second connection.

27 Claims, 15 Drawing Sheets

(51) Int. Cl.
*H04W 4/12* (2009.01)
*H04W 12/06* (2021.01)
*H04W 40/22* (2009.01)
*H04W 92/18* (2009.01)

(56) References Cited

U.S. PATENT DOCUMENTS

| | | | |
|---|---|---|---|
| 9,083,581 B1* | 7/2015 | Addepalli | H04L 1/008 |
| 9,591,582 B1* | 3/2017 | Rabii | H04L 43/028 |
| 2006/0168081 A1* | 7/2006 | Okada | H04L 67/325 |
| | | | 709/207 |
| 2009/0109850 A1* | 4/2009 | Li | H04W 72/1242 |
| | | | 370/235 |
| 2009/0285201 A1* | 11/2009 | Ben-Haim | H04L 47/2416 |
| | | | 370/352 |
| 2012/0246321 A1* | 9/2012 | Dawson | H04W 28/22 |
| | | | 709/226 |
| 2012/0259988 A1* | 10/2012 | Erringer | H04L 67/148 |
| | | | 709/228 |
| 2013/0064187 A1* | 3/2013 | Patil | H04W 4/70 |
| | | | 370/329 |
| 2013/0142038 A1* | 6/2013 | Pan | H04L 47/25 |
| | | | 370/230 |
| 2014/0362728 A1* | 12/2014 | Krochmal | H04W 12/02 |
| | | | 370/254 |
| 2015/0127733 A1* | 5/2015 | Ding | H04W 8/005 |
| | | | 709/204 |
| 2015/0237554 A1* | 8/2015 | Craig | H04W 36/0011 |
| | | | 370/332 |
| 2015/0312953 A1* | 10/2015 | Wang | H04L 1/00 |
| | | | 370/312 |
| 2016/0095017 A1* | 3/2016 | Ely | H04W 28/20 |
| | | | 455/454 |
| 2016/0295622 A1* | 10/2016 | Huang | H04W 48/18 |
| 2017/0134985 A1* | 5/2017 | Venkatachalam Jayaraman | |
| | | | H04W 28/085 |
| 2017/0295600 A1* | 10/2017 | Hassan | H04L 67/1063 |
| 2017/0331887 A1* | 11/2017 | Fishler | H04L 63/0428 |
| 2020/0351716 A1* | 11/2020 | Zu | H04W 28/08 |
| 2020/0351747 A1* | 11/2020 | Verger | H04W 76/22 |

* cited by examiner

BANDWIDTH SHARING AMONGST TRUSTED PEERS

BACKGROUND

Various systems have been developed that allow client devices to access applications and/or data files over a network. Certain products offered by Citrix Systems, Inc., of Fort Lauderdale, Fla., including the Citrix Workspace™ family of products, provide such capabilities.

SUMMARY

This Summary is provided to introduce a selection of concepts in a simplified form that are further described below in the Detailed Description. This Summary is not intended to identify key features or essential features, nor is it intended to limit the scope of the claims included herewith.

In some of the disclosed embodiments, a first device connected to a network via a first connection may perform a method that involves determining a need for improved communication between the first device and the network, receiving a message from a second device that includes an indication of at least one performance parameter of a second connection between the second device and the network, establishing a peer-to-peer connection between the first device and the second device based at least in part on the indication, and communicating with the network via a communications channel that includes the peer-to-peer connection and the second connection.

In other of the disclosed embodiments, a second device may perform a method, in conjunction with a first device connected to a network via a first connection, that involves receiving a first message broadcasted by the first device that indicates a need for improved communication between the first device and the network, determining at least one performance parameter of a second connection between the second device and the network, sending a second message to the first device including an indication of the at least one performance parameter of the second connection, and establishing a peer-to-peer connection with the first device. Once the peer-to-peer connection has been established, first data may be received from the first device via the peer-to-peer connection and sent to the network via the second connection, and second data may be received from the network via the second connection and sent to the first device via the peer-to-peer connection.

BRIEF DESCRIPTION OF THE DRAWINGS

Objects, aspects, features, and advantages of embodiments disclosed herein will become more fully apparent from the following detailed description, the appended claims, and the accompanying figures in which like reference numerals identify similar or identical elements. Reference numerals that are introduced in the specification in association with a figure may be repeated in one or more subsequent figures without additional description in the specification in order to provide context for other features, and not every element may be labeled in every figure. The drawings are not necessarily to scale, emphasis instead being placed upon illustrating embodiments, principles and concepts. The drawings are not intended to limit the scope of the claims included herewith.

DETAILED DESCRIPTION

For purposes of reading the description of the various embodiments below, the following descriptions of the sections of the specification and their respective contents may be helpful:

Section A provides an introduction to example embodiments of systems for sharing bandwidth amongst trusted peers;

Section B describes a network environment and computing environment which may be useful for practicing embodiments described herein;

Section C describes example embodiments of appliances that may deployed in a networking environment such as that describe in Section B;

Section D describes embodiments of systems and methods for virtualizing an application delivery controller;

Section E describes embodiments of systems and methods for enabling file sharing over one or more networks;

Section F describes embodiments of systems and methods for managing and streamlining access by clients to a variety of resources;

Section G provides a detailed description of example embodiments of systems for sharing bandwidth amongst trusted peers; and Section H describes example implementations of methods, systems, and computer-readable media in accordance with the present disclosure.

A. Introduction to Illustrative Embodiments of a System for Sharing Bandwidth Amongst Peers Circumstances can arise in which an ability of one device to access a resource over a network is hampered because the device's network connection becomes inadequate for some reason. Offered is a system in which such a device may seamlessly and securely borrow excess bandwidth from another device that is connected to the desired network through a different, superior connection.

Figure 1:
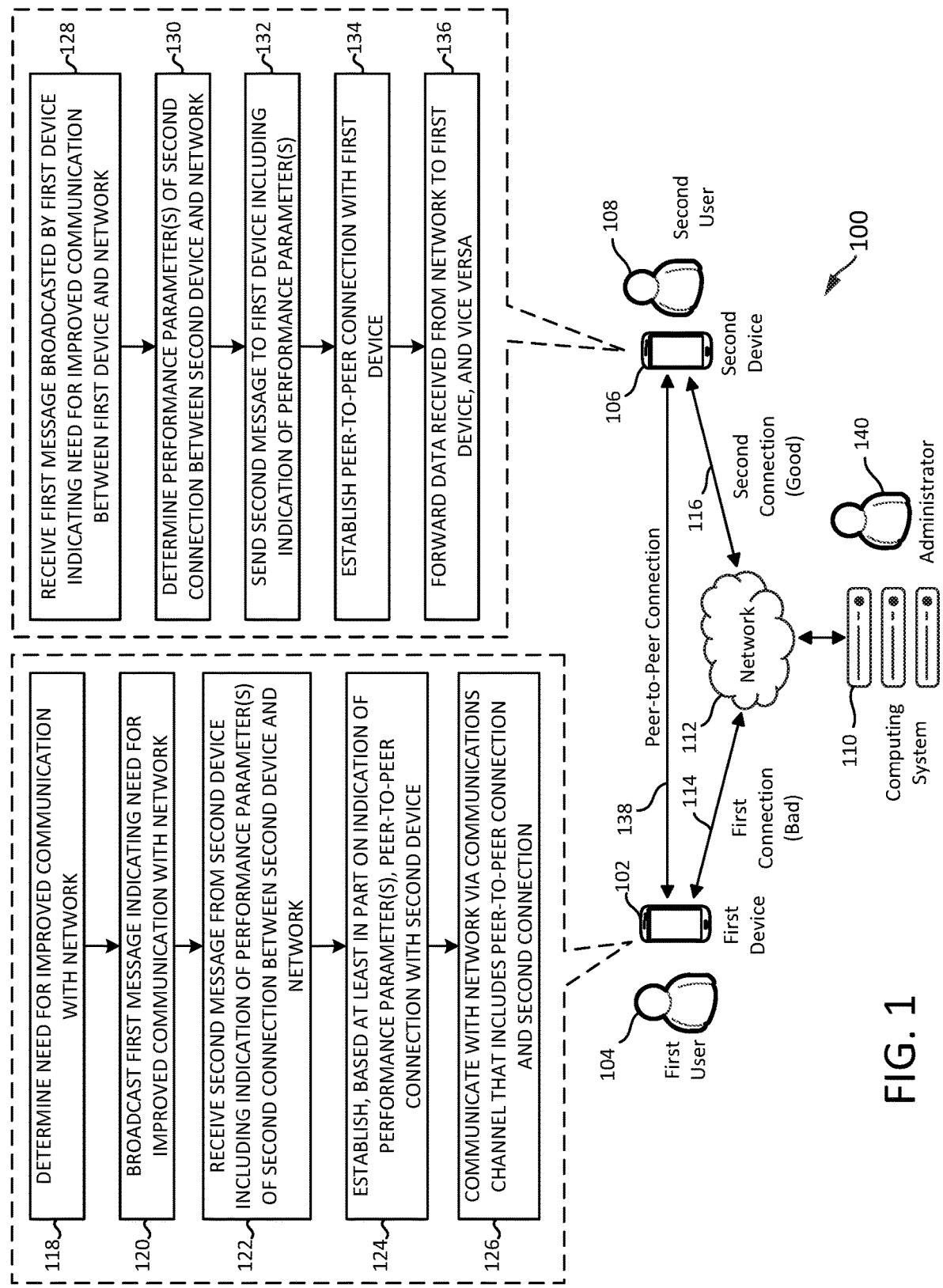
FIG. 1 is a diagram illustrating certain features of a system for sharing bandwidth amongst trusted peers configured in accordance with the present disclosure.

FIG. 1 illustrates an example configuration of a system 100 that may be used to implement various aspects of the present disclosure. As shown, the system 100 may include a first device 102 operated by a first user 104, a second device 106 operated by a second user 108, and a computing system 110. Although the illustrated example shows the computing system 110 as including just three servers, it should be appreciated that the computing system 110 may include any number of servers (including only a single server) as well as any number of additional or different components, such as one or more databases, other network components, etc. As shown in FIG. 1, the computing system 110, the first device 102, and the second device 106 may each be connected to a network 112. The network 112 may, for example, include the Internet, as well as one or more other networks in addition to or in lieu of the Internet. In the example shown, the first device 102 is connected to the network 112 via a first connection 114, and the second device 106 is connected to the network 112 via a second connection 116. In some embodiments, the first connection 114 and the second connection 116 may be established through different network service providers. In other embodiments, the first connection 114 and the second connection 116 may be established through the same network service provider. In either case, circumstances may exist in which one of the two connections, e.g., the "good" second connection 116 shown in FIG. 1, is superior to the other connection, e.g., the "bad" first connection 114 shown in FIG. 1.

The superiority of one connection over another may be due to any of a number of factors and may be manifested in any of numerous ways. For example, when different devices connect to the Internet using different network service providers, one service provider may provide better coverage than another in a particular region. As a result, the available bandwidth of one connection may be greater than another, the round trip latency of communications over one connection may be lower than over the other, the packet loss percentage over one connection may be lower than over the other, the packet jitter over one connection may be lower than over the other, the page response time over one connection may be higher than over the other, etc. And even when different devices connect to a network (e.g., the Internet) using the same network service provider, the quality of one connection may be superior to another due to factors such as the different locations of the devices with respect to one or more cell towers, the presence of obstacles or interfering signal sources in the vicinities of the two devices, different levels of congestion on different channels, etc.

The inventors have recognized and appreciated that there may be circumstances in which a level of trust may exist between two or more peer devices that allows the two devices to seamlessly and securely share network bandwidth with one another when, based on an exchange of messages, it is determined that one of the devices needs additional bandwidth and the other device has excess bandwidth available to share.

FIG. 1 shows examples of routines that may be performed by the first device 102 and the second device 106 in accordance with some aspects of the present disclosure. As shown, at a step 118, the first device 102 may determine that it needs improved communication (e.g., additional bandwidth) with the network 112. The determination of step 118 may be made in any of a number of ways and for any of numerous reasons. In some embodiments, for example, the first device 102 may be accessing a particularly critical application provided by the computing system 110, and the first device 102 may determine that one or more performance parameters of the first connection 114 (e.g., available bandwidth, round trip latency, packet loss percentage, packet jitter, and/or page response time) are inadequate to service the critical application. As explained in more detail below, whether a particular application is deemed "critical" may, for example, be determined by an administrator 140 of the computing system 110.

In some embodiments, the computing system 110 may provide a virtual workspace environment to the first device 102 and the second device 106, as well as many more devices associated with a business or other enterprise. The Citrix Workspace™ and Citrix Virtual Apps and Desktops™, by Citrix Systems, Inc., of Fort Lauderdale, Fla., are some examples of computing systems capable of providing such an environment. In at least some such embodiments, the first user 104 and the second user 108 may be required to authenticate their identities prior to being able to access one or more resources provided by the computing system 110. In some embodiments, such authentication may provide the requisite level of trust between the devices 102, 106 to allow seamless and secure sharing of bandwidth as described herein.

As shown in FIG. 1, at a step 120, the first device 102 may broadcast a first message indicating its need for improved communication with the network 112, and, at a step 122, the first device 102 may receive a second message from the second device 106 as a response to the first message. As shown, the second message may include an indication of one or more performance parameters (e.g., available bandwidth, round trip latency, packet loss percentage, packet jitter, page response time, etc.) of the second connection 116.

As shown on the right-hand side of FIG. 1, at a step 128, the second device 106 may receive the first message (broadcasted by the first device 102) which indicates the first device's need for improved communication with the network 112. At a step 130, the second device 106 may determine one or more performance parameters (e.g., available bandwidth, round trip latency, packet loss percentage, packet jitter, page response time, etc.) of the second connection 116. In some embodiments, the second device 106 may, for example, determine such performance parameter(s) by exchanging data with the computing system 110 over the second connection 116. At the step 132, the second device 106 may send the second message to the first device 102 which indicates the determined performance parameter(s) of the second connection 116.

After the first device 102 has received the second message (at the step 122), the first device 102 and the second device 106 may, at steps 124 and 134, respectively, establish a peer-to-peer connection 138 with one another. As indicated, the first device 102 may establish the peer-to-peer connection 138 based at least in part on the indication of the performance parameter(s) of the second connection 116. In some embodiments, for example, the first device 102 may evaluate the available bandwidth (and possibly other performance parameters) of the second connection 116 to determine whether the second connection 116 is adequate for the first device's needs (e.g., to service a critical application) and/or whether the second connection 116 is a better option than other connections to the network 112 that could be provided by other devices (not shown in FIG. 1). In some embodiments, for example, the first device 102 may determine to establish the peer-to-peer connection 138 only if the indicated available bandwidth of the second connection 116 is greater than a threshold value. Additionally or alternatively, the first device 102 may determine to establish the peer-to-peer connection 138 only if the round trip latency of communications over the second connection 116 is below a threshold value, only if the packet loss percentage over the second connection 116 is below a threshold value, only if the packet jitter over the second connection 116 is lower than a threshold value and/or only if the page response time over the second connection 116 is below a threshold value.

Further, in some embodiments, in addition to the second message received from the second device 106, the first device 102 may receive similar messages from one or more other devices in response to the first device's broadcasted need for improved communication with the network 112. The first device 102 may then select the best option from among the responding peer devices to meet the first device's network needs with respect to accessing the resource on the computing system 110. For example, in some embodiments, the first device 102 may select the responding peer device that has the network connection with the highest available bandwidth. In other embodiments, the first device 102 may additionally or alternatively take other determined performance parameters of the respective network connections into account, such as round trip latency, packet loss percentage, packet jitter, page response time, etc., when selecting the device with which to establish the peer-to-peer connection 138. Further, in some embodiments, the first device 102 may additionally or alternatively determine the signal strength of the signals emitted by the various responding devices and also or instead take the respective signal strengths into account during the process of selecting the device with which to establish the peer-to-peer connection 138.

In some embodiments, the nature of the resource being accessed may also be taken into account when selecting a peer device with which to establish the peer-to-peer connection 138. For example, if the first user is participating in a web-conference hosted by, or otherwise streaming video from, the computing system 110, high available bandwidth, low packet jitter, and low round trip latency may be important, but a moderate amount of packet loss may be acceptable. If the user is downloading a file, on the other hand, minimal packet loss may be of a higher importance and a slightly lower available bandwidth, a higher round trip latency, and a higher level of packet jitter may be acceptable.

At a step 126 (on the left-hand side of FIG. 1), once the peer-to-peer connection 138 has been established, the first device 102 may communicate with the network 112, e.g., to access a critical application provided by the computing system 110, via a communications channel that includes both the peer-to-peer connection 138 and the second connection 116. As shown, such communications may be enabled by the second device 106 which, at a step 136 (on the right-hand side of FIG. 1), forwards data it receives from the network 112 via the second connection 116 to the first device 102 via the peer-to-peer connection 138, and also forwards data it receives from the first device 102 via the peer-to-peer connection 138 to the network 112 via the second connection 116. In some embodiments, communications between the first device 102 and the second device 106 via the peer-to-peer connection 138 may be encrypted and decrypted using at least one token possessed by each of the first device 102 and the second device 106. In some embodiments, such a token may be provided to each device 102, 106 only after a user 104, 108 has successfully authenticated his or her identity to the computing system 110, such as by logging into the computing system 110 to access a virtual computing environment on the device 102, 106.

Thus, in the embodiment shown in FIG. 1, the second device 106 may seamlessly and securely tether the first device 102 to the network 112 and allow the first device 102 to continue accessing the network 112 (e.g., by using a critical application) using excess available bandwidth of the second connection 116, even though the first connection 114 has become inadequate for that purpose. Further, although not shown in FIG. 1, it should be appreciated that, for devices that have multiple communication interfaces in addition to the interface providing the network connection that is determined to be inadequate, e.g., one or more Wi-Fi interfaces, Bluetooth interfaces, etc., multiple peer-to-peer connections can be established either with the same peer device or with different peer devices, and multiple communications channels may be established between the first device 102 and the network 112 using such channels. Channel bonding techniques may then be used to allow the first device 102 to communicate with the network 112 using the combined bandwidth of the respective communication channels enabled by such multiple peer-to-peer connections.

Additional details and example implementations of embodiments of the present disclosure are set forth below in Section F, following a description of example systems and network environments in which such embodiments may be deployed.

B. Network and Computing Environment

Figure 2A:
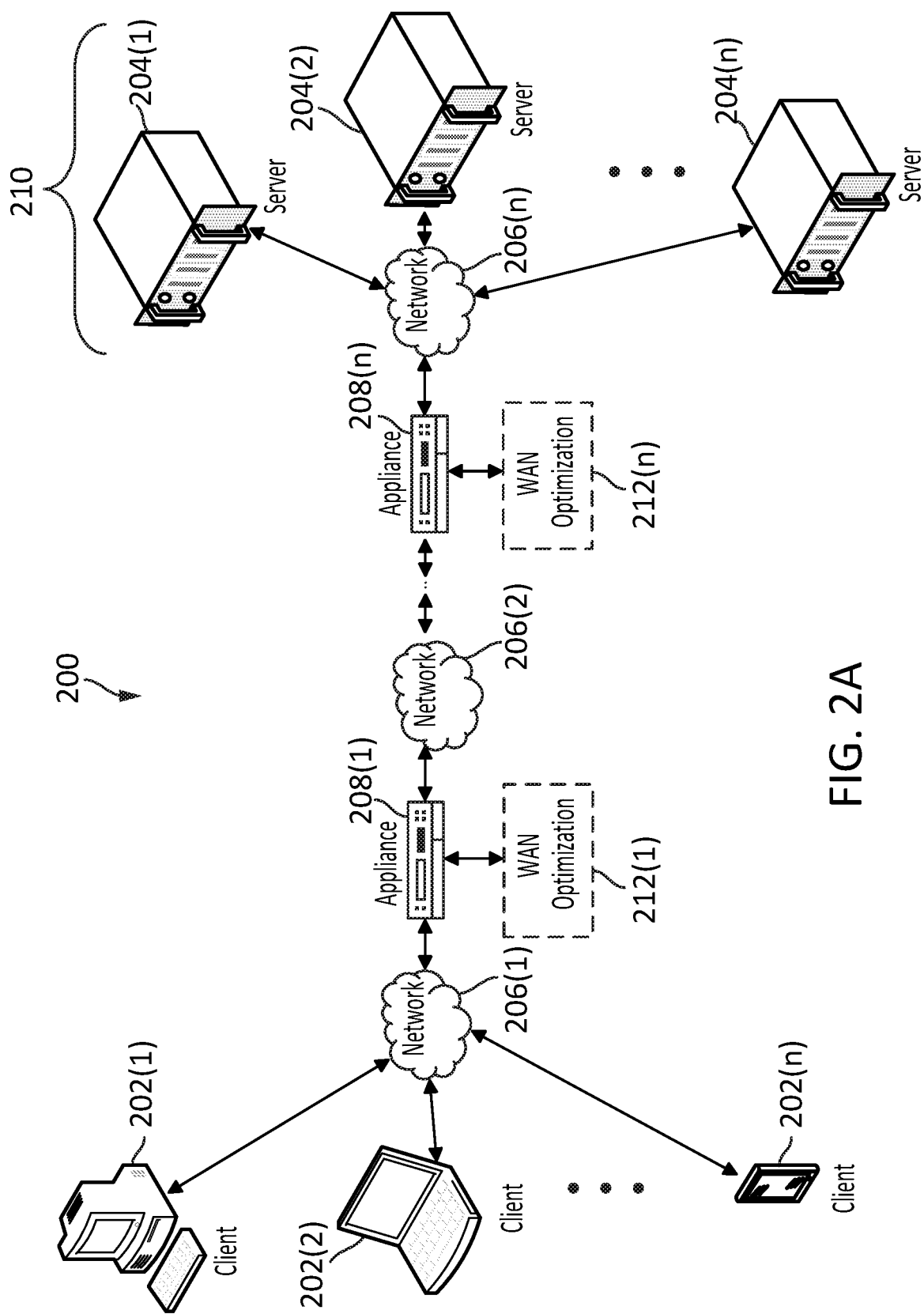
FIG. 2A is a diagram of a network computing environment in which some embodiments of the bandwidth sharing techniques disclosed herein may deployed.

Referring to FIG. 2A, an illustrative network environment 200 is depicted. As shown, the network environment 200 may include one or more clients 202(1)-202(n) (also generally referred to as local machine(s) 202 or client(s) 202) in communication with one or more servers 204(1)-204(n) (also generally referred to as remote machine(s) 204 or server(s) 204) via one or more networks 206(1)-206(n) (generally referred to as network(s) 206). In some embodiments, a client 202 may communicate with a server 204 via one or more appliances 208(1)-208(n) (generally referred to as appliance(s) 208 or gateway(s) 208).

Although the embodiment shown in FIG. 2A shows one or more networks 206 between the clients 202 and the servers 204, in other embodiments, the clients 202 and the servers 204 may be on the same network 206. When multiple networks 206 are employed, the various networks 206 may be the same type of network or different types of networks. For example, in some embodiments, the networks 206(1)

and 206(n) may each be a private network such as a local area network (LAN) or a company Intranet, while the network 206(2) may be a public network, such as a wide area network (WAN) or the Internet. In other embodiments, one or both of the network 206(1) and the network 206(n), as well as the network 206(2), may be public networks. In yet other embodiments, all three of the network 206(1), the network 206(2) and the network 206(n) may be private networks. The networks 206 may employ one or more types of physical networks and/or network topologies, such as wired and/or wireless networks, and may employ one or more communication transport protocols, such as transmission control protocol (TCP), internet protocol (IP), user datagram protocol (UDP) or other similar protocols.

As shown in FIG. 2A, one or more appliances 208 may be located at various points or in various communication paths of the network environment 200. For example, the appliance 208(1) may be deployed between the network 206(1) and the network 206(2), and the appliance 208(n) may be deployed between the network 206(2) and the network 206(n). In some embodiments, the appliances 208 may communicate with one another and work in conjunction to, for example, accelerate network traffic between the clients 202 and the servers 204. In some embodiments, each appliance 208 may act as a gateway between two or more networks. In other embodiments, one or more of the appliances 208 may instead be implemented in conjunction with or as part of a single one of the clients 202 or servers 204 to allow such device to connect directly to one of the networks 206. In some embodiments, one or more of the appliances 208 may be implemented as network devices sold by Citrix Systems, Inc., of Fort Lauderdale, Fla., such as Citrix Gateway™ or Citrix ADC™.

As shown in FIG. 2A, in some embodiments, groups of the servers 204 may operate as one or more server farms 210. The servers 204 of each such server farm 210 may be logically grouped, and may either be geographically co-located (e.g., on premises) or geographically dispersed (e.g., cloud based) from the clients 202 and/or other servers 204. In some embodiments, as explained in more detail below, one or more server farms 210 may execute one or more applications on behalf of one or more of clients 202 (e.g., as an application server system) and/or may facilitate the sharing of files between the clients 202 (e.g., as a file sharing system), although other uses are possible, such as a file server, gateway server, proxy server, or other similar server uses. In some embodiments, two or more server farms 210 may communicate with one another, e.g., via respective appliances 208 connected to the network 206(2), to allow multiple server-based processes to interact with one another.

As also shown in FIG. 2A, in some embodiments, one or more of the appliances 208 may include, be replaced by, or be in communication with, one or more additional appliances, such as WAN optimization appliances 212(1)-212(n), referred to generally as WAN optimization appliance(s) 212. For example, each WAN optimization appliance 212 may accelerate, cache, compress or otherwise optimize or improve performance, operation, flow control, or quality of service of network traffic, such as traffic to and/or from a WAN connection, such as optimizing Wide Area File Services (WAFS), accelerating Server Message Block (SMB) or Common Internet File System (CIFS). In some embodiments, one or more of the appliances 212 may be a performance enhancing proxy or a WAN optimization controller. In some embodiments, for example, one or more of the appliances 212 may be implemented as products sold by Citrix Systems, Inc., of Fort Lauderdale, Fla., such as Citrix SD-WAN™ or Citrix Cloud™.

Figure 2B:
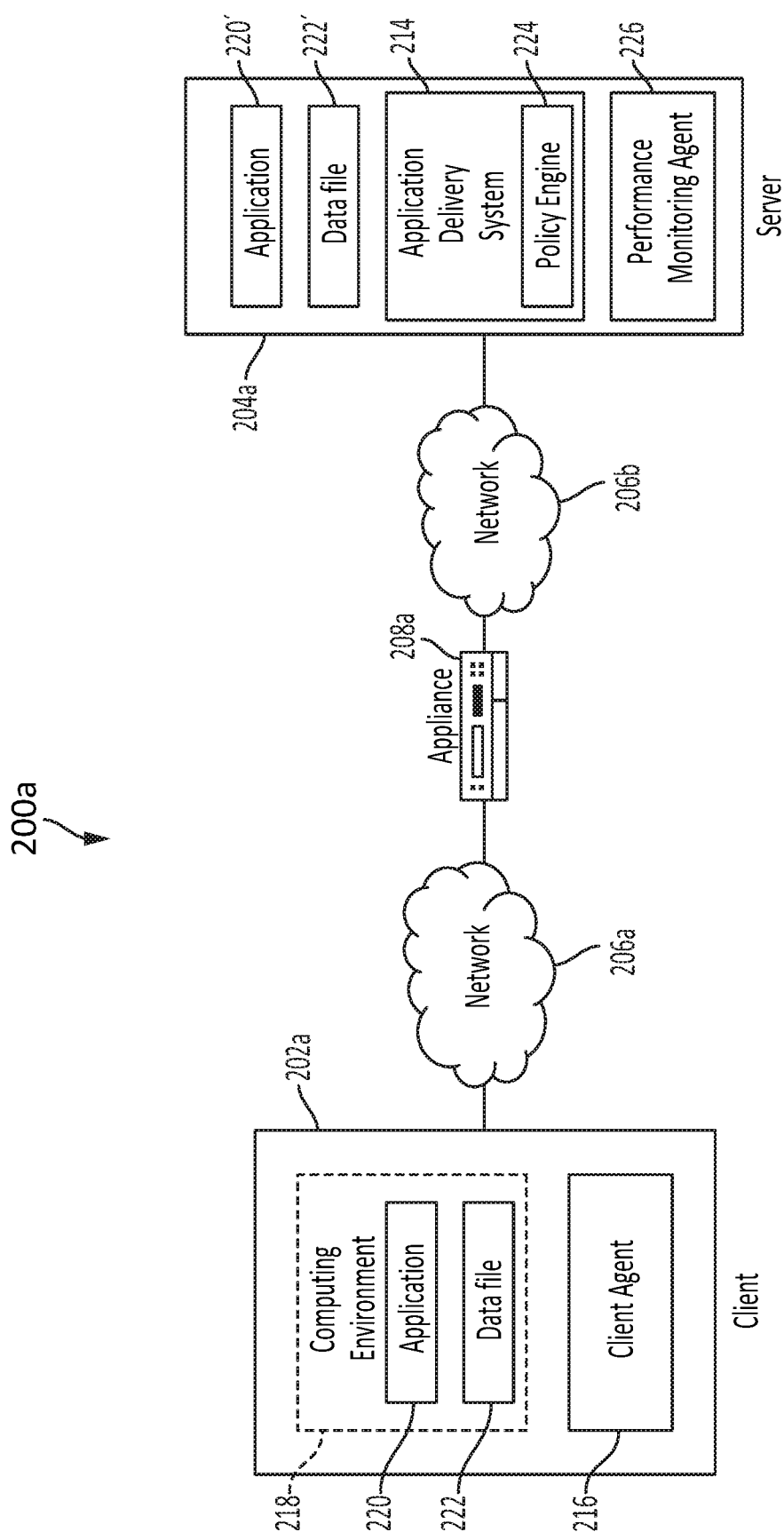
FIG. 2B is a diagram illustrating how a network computing environment like that shown in FIG. 2A may be configured to deliver a computing environment from a server to a client.

Referring to FIG. 2B, an example network environment 200a for delivering and/or operating a computing environment on a client 202a is shown. As shown in FIG. 2B, in some embodiments, a client 202a may include a computing environment 218, and a server 204a may include an application delivery system 214 for delivering a computing environment, application, and/or data files to one or more clients 202.

In some embodiments, each client 202 may additionally include a client agent 216 for establishing and exchanging communications with the appliance 208 and/or the server(s) 204 via a network 206. The client 202a may, for example, have installed and/or execute one or more applications that are in communication with the network 206a. In some embodiments, the client agent 216 may intercept network communications from a network stack used by the one or more applications. For example, the client agent 216 may intercept a network communication at any point in a network stack and redirect the network communication to a destination desired, managed, and/or controlled by the client agent 216, for example, to intercept and redirect a transport layer connection to an IP address and port controlled and/or managed by the client agent 216. The client agent 216 may thus, in some embodiments, transparently intercept any protocol layer below the transport layer, such as the network layer, and any protocol layer above the transport layer, such as the session, presentation, or application layers. The client agent 216 may, for example, interface with the transport layer to secure, optimize, accelerate, route, and/or load-balance any communications provided via any protocol carried by the transport layer.

In some embodiments, the client agent 216 may be implemented as an Independent Computing Architecture (ICA) client developed by Citrix Systems, Inc. The client agent 216 may perform acceleration, streaming, monitoring, and/or other operations. For example, the client agent 216 may accelerate streaming an application from the server 204a to the client 202a. The client agent 216 may also perform end-point detection/scanning and/or collect end-point information about the client 202a for the appliance 208a and/or the server 204a. The appliance 208a and/or the server 204a may use the collected information to determine and provide access, authentication, and/or authorization control of the client's connection to the network 206a. For example, the client agent 216 may identify and determine one or more client-side attributes, such as: the operating system and/or a version of an operating system, a service pack of the operating system, a running service, a running process, a file, presence or versions of various applications of the client, such as antivirus, firewall, security, and/or other software.

The computing environment 218 may, for example, execute or operate an application 220 that accesses, processes and/or uses a data file 222. The computing environment 218, application 220 and/or data file 222 may be delivered via an appliance 208a and/or the server 204a.

The appliance 208a may accelerate delivery of all or a portion of the computing environment 218 to the client 202a, for example by the application delivery system 214. For example, the appliance 208a may accelerate delivery of a streaming application 220' and data file 222' processable by the application 220 from a data center to a remote user location by accelerating transport layer traffic between the client 202a and the server 204a. Such acceleration may be provided by one or more techniques, such as: 1) transport layer connection pooling, 2) transport layer connection multiplexing, 3) transport control protocol buffering, 4) compression, 5) caching, or other techniques. The appliance 208a may also provide load balancing of servers 204 in a server farm 210 (shown in FIG. 2A) to process requests from the clients 202, act as a proxy or access server to provide access to the one or more servers 204, provide security and/or act as a firewall between the clients 202 and the servers 204, provide Domain Name Service (DNS) resolution, provide one or more virtual servers or virtual internet protocol servers, and/or provide secure virtual private network (VPN) connections from the clients 202 to the servers 204, such as a secure socket layer (SSL) VPN connection and/or provide encryption and decryption operations.

The application delivery system 214 may deliver the computing environment 218 to a user (e.g., client 202a), remote or otherwise, based on authentication and authorization policies applied by a policy engine 224. A remote user may obtain a computing environment and access to server stored applications 220' and data files 222' from any network-connected device (e.g., the client 202a). For example, the appliance 208a may request an application 220' and data file 222' from the server 204a. In response to the request, the application delivery system 214 and/or the server 204a may deliver the application 220' and data file 222' to the client 202a, for example via an application stream to operate in the computing environment 218 on client the 202a, or via a remote-display protocol or otherwise via remote-based or server-based computing. In an embodiment, application delivery system 214 may be implemented as any portion of the Citrix Workspace™ and Citrix Virtual Apps and Desktops™ by Citrix Systems, Inc., of Fort Lauderdale, Fla.

The policy engine 224 may control and manage the access to, and execution and delivery of, applications. For example, the policy engine 224 may determine the one or more applications a user or client 202 may access and/or how the application should be delivered to the user or client 202, such as a server-based computing, streaming or delivering the application locally to the client 202 for local execution.

For example, in operation, the client 202a may request execution of an application (e.g., application 220') and the application delivery system 214 of the server 204a may determine how to execute the application 220', for example based upon credentials received from the client 202a and a user policy applied by the policy engine 224 associated with the credentials. For example, the application delivery system 214 may enable the client 202a to receive application-output data generated by execution of the application on the server 204a, may enable client the 202a to execute the application 220 locally after receiving the application from the server 204a, or may stream the application via one or more networks 206a, 206b to the client 202a. For example, in some embodiments, the application 220 may be a server-based or a remote-based application executed on the server 204a on behalf of the client 202a. The server 204a may display output to the client 202a using a thin-client or remote-display protocol, such as the Independent Computing Architecture (ICA) protocol by Citrix Systems, Inc. The application 220 may be any application related to real-time data communications, such as applications for streaming graphics, streaming video and/or audio or other data, delivery of remote desktops or workspaces or hosted services or applications, for example infrastructure as a service (IaaS), workspace as a service (WaaS), software as a service (SaaS) or platform as a service (PaaS).

As shown, one or more servers 204 may also include a performance monitoring service or agent 226. In some embodiments, a dedicated one or more servers 204 may be employed to perform performance monitoring. Performance monitoring may be performed using data collection, aggregation, analysis, management and reporting, for example by software, hardware or a combination thereof. Performance monitoring may include one or more agents for performing monitoring, measurement and data collection activities on one or more clients 202 (e.g., the client agent 216), one or more servers 204 (e.g., the agent 226) and/or one or more appliances 208 and/or 212 (agent not shown). In general, the monitoring agents (e.g., agent 216 and/or agent 226) may execute transparently (e.g., in the background) to any application and/or user of the device. In some embodiments, the monitoring agent 226 may be implemented as Citrix Analytics™ by Citrix Systems, Inc., of Fort Lauderdale, Fla.

The monitoring agents may, for example, monitor, measure, collect, and/or analyze data on a predetermined frequency, based upon an occurrence of given event(s), or in real time during operation of the network environment 200a. The monitoring agents may monitor resource consumption and/or performance of hardware, software, and/or communications resources of the clients 202, networks 206, appliances 208 and/or 212, and/or servers 204. For example, network connections such as a transport layer connection, network latency, bandwidth utilization, end-user response times, application usage and performance, session connections to an application, cache usage, memory usage, processor usage, storage usage, database transactions, client and/or server utilization, active users, duration of user activity, application crashes, errors, or hangs, the time required to log-in to an application, a server, or the application delivery system, and/or other performance conditions and metrics may be monitored.

The monitoring agents may provide application performance management for the application delivery system 214. For example, based upon one or more monitored performance conditions or metrics, the application delivery system 214 may be dynamically adjusted, for example periodically or in real-time, to optimize application delivery by the servers 204 to the clients 202 based upon network environment performance and conditions.

Figure 2C:
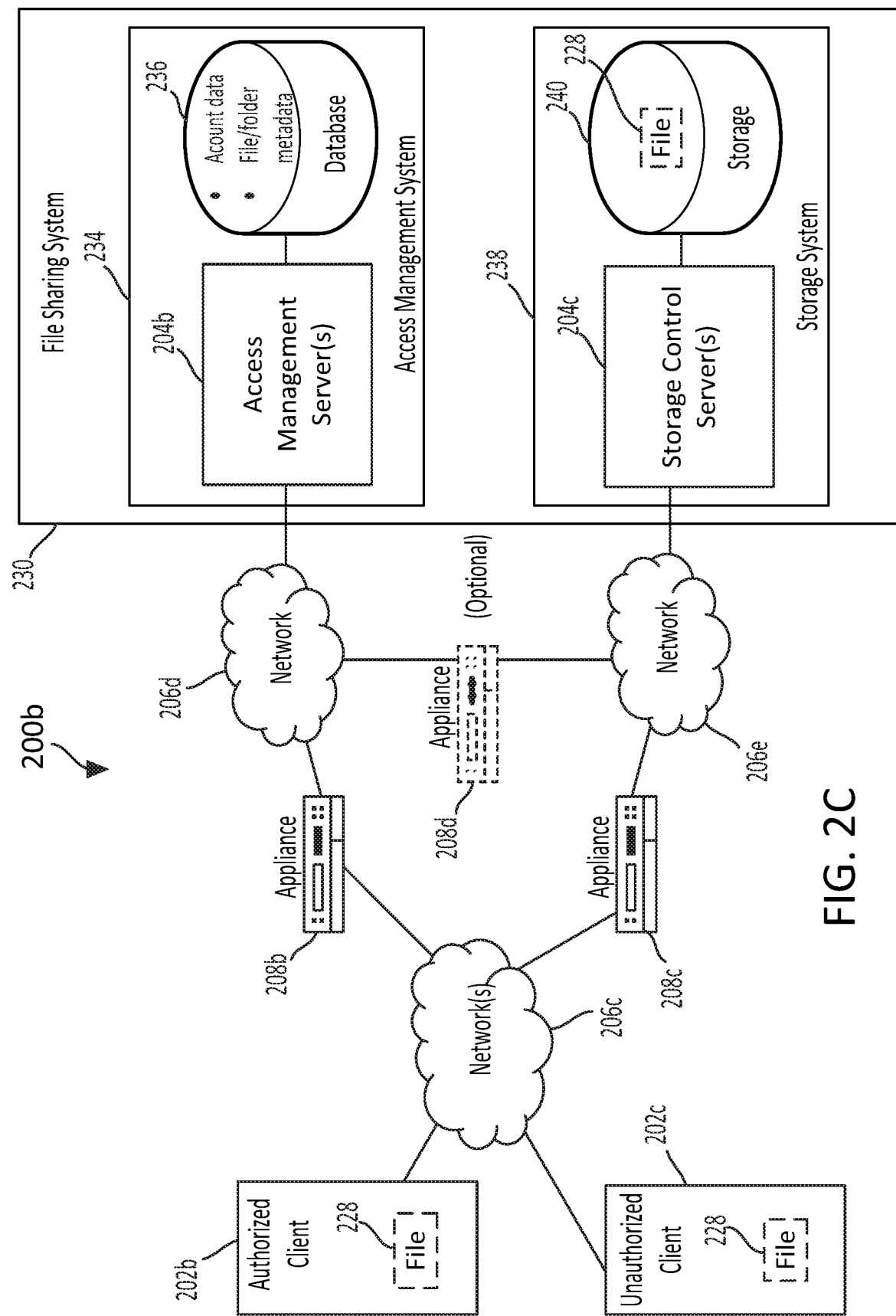
FIG. 2C is a diagram illustrating how a network computing environment like that shown in FIG. 2A may be configured to allow clients to access an example embodiment of a server-based file sharing system.

FIG. 2C shows an example network environment 200b for allowing an authorized client 202b and/or an unauthorized client 202c to upload a file 228 to a file sharing system 230 or download a file 228 from the file sharing system 230. The authorized client 202b may, for example, be a client 202 operated by a user having an active account with the file sharing system 230, while the unauthorized client 202c may be operated by a user who lacks such an account.

As FIG. 2C illustrates, in some embodiments, the file sharing system 230 may include an access management system 234 and a storage system 238. As shown, the access management system 234 may include one or more access management servers 204b and a database 236, and the storage system 238 may include one or more storage control servers 204c and a storage medium 240. In some embodiments, the access management server(s) 204b may, for example, allow a user of the client 202b to log in to his or her account, e.g., by entering a user name and password corresponding to account data stored in the database 236. Once the user of the client 202b has logged in, the access management server 204b may enable the user to view (via the authorized client 202b) information identifying various folders represented in the storage medium 240, which is managed by the storage control server(s) 204c, as well as any files 228 contained within such folders. File/folder metadata stored in the database 236 may be used to identify the files 228 and folders in the storage medium 240 to which a particular user has been provided access rights.

In some embodiments, the clients 202b, 202c may be connected to one or more networks 206c (which may include the Internet), the access management server(s) 204b may include webservers, and an appliance 208b may load balance requests from the authorized client 202b to such webservers. The database 236 associated with the access management server(s) 204b may, for example, include information used to process user requests, such as user account data (e.g., username, password, access rights, security questions and answers, etc.), file and folder metadata (e.g., name, description, storage location, access rights, source IP address, etc.), and logs, among other things. Although the clients 202b, 202c are shown is FIG. 2C as stand-alone computers, it should be appreciated that one or both of the clients 202b, 202c shown in FIG. 2C may instead represent other types of computing devices or systems that can be operated by users. In some embodiments, for example, one or both of the authorized client 202b and the unauthorized client 202c may be implemented as a server-based virtual computing environment that can be remotely accessed using a separate computing device operated by users, such as described above in connection with FIG. 2B.

In some embodiments, the access management system 234 may be logically separated from the storage system 238, such that files 228 and other data that are transferred between clients 202 and the storage system 238 do not pass through the access management system 234. Similar to the access management server(s) 204b, one or more appliances 208b-d may load-balance requests from the clients 202b, 202c received from the network(s) 206c (which may include the Internet) to the storage control server(s) 204c. In some embodiments, the storage control server(s) 204c and/or the storage medium 240 may be hosted by a cloud-based service provider (e.g., Amazon Web Services or Microsoft Azure). In other embodiments, the storage control server(s) 204c and/or the storage medium 240 may be located at a data center managed by an enterprise of a client 202, or may be distributed among some combination of a cloud-based system and an enterprise system, or elsewhere.

After a user of the authorized client 202b has properly logged in to an access management server 204b, the server 204b may receive a request from the client 202b for access to one of the files 228 or folders to which the logged in user has access rights. The request may either be for the authorized client 202b to itself to obtain access to a file 228 or folder or to provide such access to the unauthorized client 202c. In some embodiments, in response to receiving an access request from an authorized client, the access management server 204b may communicate with the storage control server(s) 204c (e.g., either over the Internet via appliances 208b and 208c or via an appliance 208d positioned between networks 206d and 206e) to obtain a token generated by the storage control server 204c that can subsequently be used to access the identified file 228 or folder.

In some embodiments, the generated token may, for example, be sent to the authorized client 202b, and the authorized client 202b may then send a request for a file 228, including the token, to the storage control server(s) 202c. In other embodiments, the authorized client 202b may send the generated token to the unauthorized client 202c so as to allow the unauthorized client 202c to send a request for the file 228, including the token, to the storage control server(s) 202c. In yet other embodiments, an access management server 204b may, at the direction of the authorized client 202b, send the generated token directly to the unauthorized client 202c so as to allow the unauthorized client 202c to send a request for the file 228, including the token, to the storage control server(s) 202c. In any of the forgoing scenarios, the request sent to the storage control server(s) may, in some embodiments, include a uniform resource locator (URL) that resolves to an internet protocol (IP) address of the storage control server(s) 202c, and the token may be appended to or otherwise accompany the URL. Accordingly, providing access to one or more clients 202 may be accomplished, for example, by causing the authorized client 202b to send a request to the URL address, or by sending an email, text message or other communication including the token-containing URL to the unauthorized client 202c, either directly from the access management server(s) 204b or indirectly from the access management server(s) 204b to the authorized client 202b and then from the authorized client 202b to the unauthorized client 202c. In some embodiments, selecting the URL or a user interface element corresponding to the URL, may cause a request to be sent to the storage control server(s) 204c that either causes a file 228 to be downloaded immediately to the client that sent the request, or may cause the storage control server 204c to return a webpage to the client that includes a link or other user interface element that can be selected to effect the download.

In some embodiments, a generated token can be used in a similar manner to allow either an authorized client 202b or an unauthorized client 202c to upload a file 228 to a folder corresponding to the token. In some embodiments, for example, an "upload" token can be generated as discussed above when an authorized client 202b is logged in and a designated folder is selected for uploading. Such a selection may, for example, cause a request to be sent to the access management server(s) 204b, and a webpage may be returned, along with the generated token, that permits the user to drag and drop one or more files 228 into a designated region and then select a user interface element to effect the upload. The resulting communication to the storage control server(s) 204c may include both the to-be-uploaded file(s) 228 and the pertinent token. On receipt of the communication, a storage control server 204c may cause the file(s) 228 to be stored in a folder corresponding to the token.

In some embodiments, sending a request including such a token to the storage control server(s) 204c (e.g., by selecting a URL or user-interface element included in an email inviting the user to upload one or more files 228 to the file sharing system 230), a webpage may be returned that permits the user to drag and drop one or more files 228 into a designated region and then select a user interface element to effect the upload. The resulting communication to the storage control server(s) 204c may include both the to-be-uploaded file(s) 228 and the pertinent token. On receipt of the communication, a storage control server 204c may cause the file(s) 228 to be stored in a folder corresponding to the token.

In the described embodiments, the clients 202, servers 204, and appliances 208 and/or 212 (appliances 212 are shown in FIG. 2A) may be deployed as and/or executed on any type and form of computing device, such as any desktop computer, laptop computer, rack-mounted computer, or mobile device capable of communication over at least one network and performing the operations described herein. For example, the clients 202, servers 204 and/or appliances 208 and/or 212 may each correspond to one computing system, a plurality of computing systems, or a network of distributed computing systems such as computing system 246 shown in FIG. 2D.

Figure 2D:
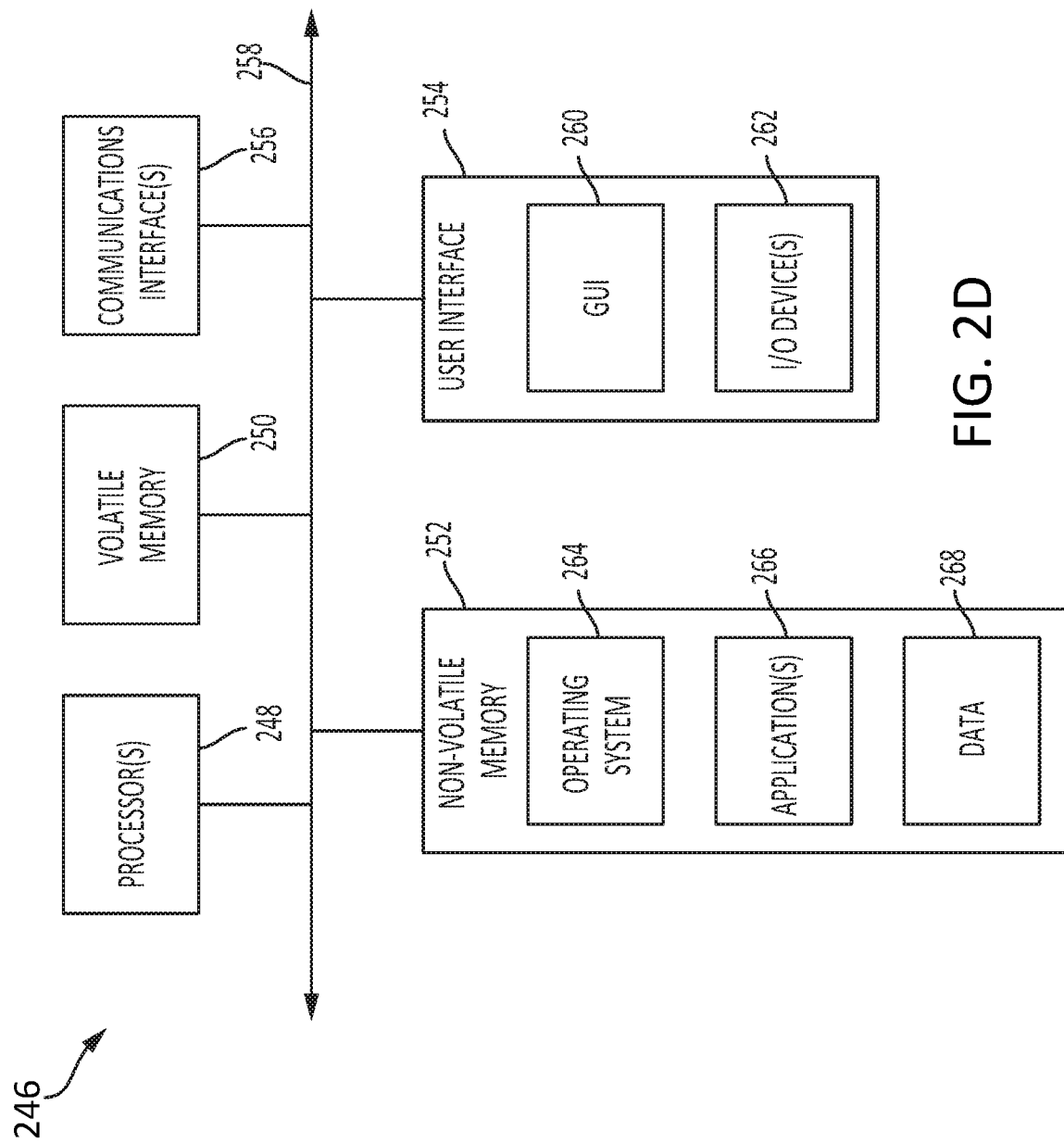
FIG. 2D is a block diagram of a computing system that may be used to implement one or more of the components of the computing environment shown in FIGS. 2A-C.

As shown in FIG. 2D, the computing system 246 may include one or more processors 248, volatile memory 250 (e.g., RAM), non-volatile memory 252 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), a user interface (UI) 254, one or more communications interfaces 256, and a communication bus 258. The user interface 254 may include a graphical user interface (GUI) 260 (e.g., a touchscreen, a display, etc.) and one or more input/output (I/O) devices 262 (e.g., a mouse, a keyboard, etc.). The non-volatile memory 252 may store an operating system 264, one or more applications 266, and data 268 such that, for example, computer instructions of the operating system 264 and/or applications 266 are executed by the processor(s) 248 out of the volatile memory 250. Data may be entered using an input device of the GUI 260 or received from I/O device(s) 262. Various elements of the computing system 246 may communicate via communication the bus 258. The computing system 246 as shown in FIG. 2D is shown merely as an example, as the clients 202, servers 204 and/or appliances 208 and 212 may be implemented by any computing or processing environment and with any type of machine or set of machines that may have suitable hardware and/or software capable of operating as described herein.

The processor(s) 248 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors.

The communications interfaces 256 may include one or more interfaces to enable the computing system 246 to access a computer network such as a LAN, a WAN, or the Internet through a variety of wired and/or wireless or cellular connections.

As noted above, in some embodiments, one or more computing systems 246 may execute an application on behalf of a user of a client computing device (e.g., a client 202), may execute a virtual machine, which provides an execution session within which applications execute on behalf of a user or a client computing device (e.g., a client 202), such as a hosted desktop session, may execute a terminal services session to provide a hosted desktop environment, or may provide access to a computing environment including one or more of: one or more applications, one or more desktop applications, and one or more desktop sessions in which one or more applications may execute.

C. Appliance Architecture

Figure 3:
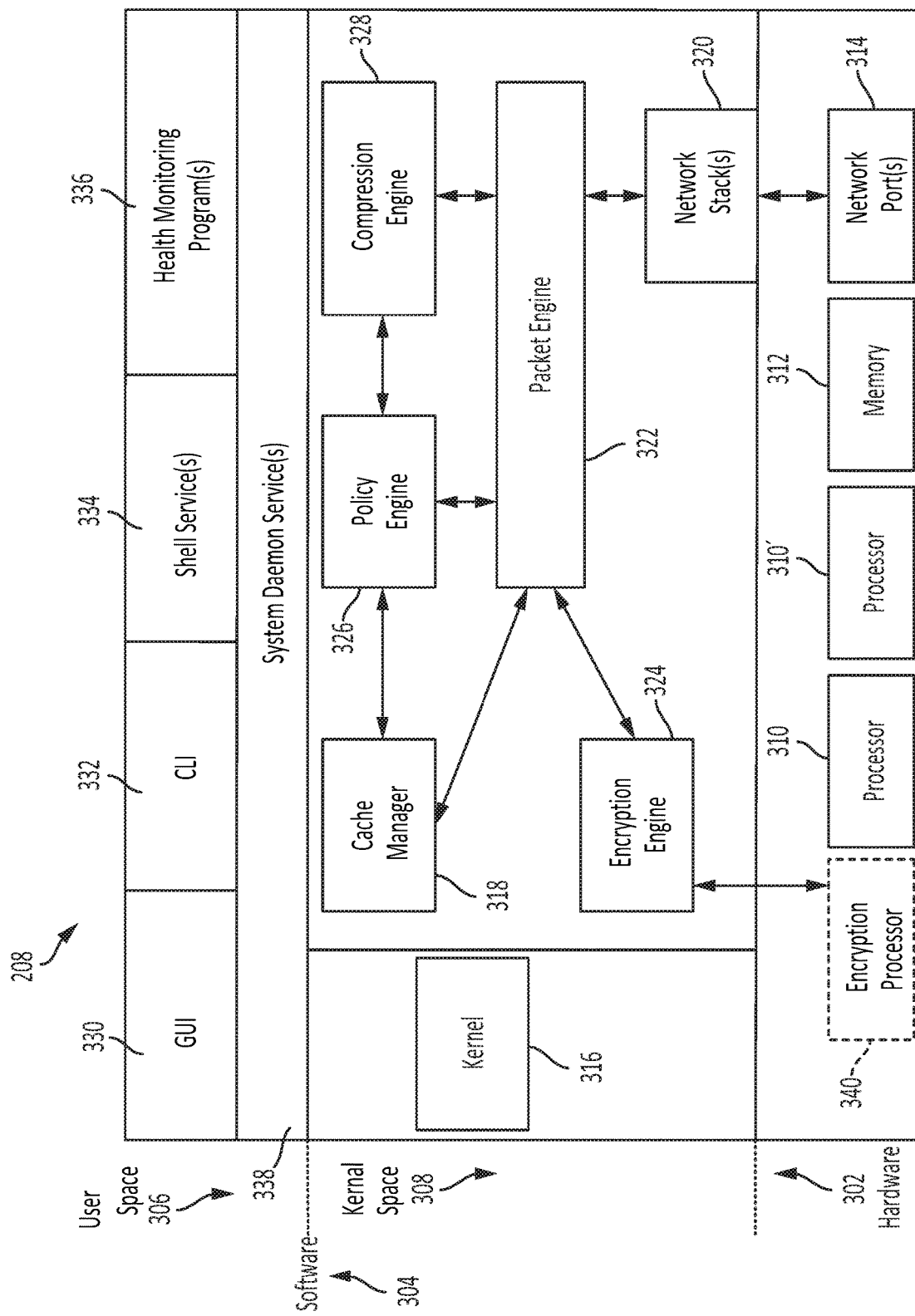
FIG. 3 is a block diagram illustrating components of an example embodiment of an appliance like those shown in FIGS. 2A-D.

FIG. 3 shows an example embodiment of an appliance 208. As described herein, the appliance 208 may be implemented as a server, gateway, router, switch, bridge or other type of computing or network device. As shown in FIG. 3, in some embodiments, the appliance 208 may include a hardware layer 302 and a software layer 304 divided into a user space 306 and a kernel space 308. The hardware layer 302 may provide the hardware elements upon which programs and services within the kernel space 308 and the user space 306 are executed, and may also allow programs and services within the kernel space 308 and the user space 306 to communicate data both internally and externally with respect to the appliance 208. As shown, the hardware layer 302 may include one or more processing units 310 for executing software programs and services, memory 312 for storing software and data, one or more network ports 314 for transmitting and receiving data over one or more networks 206, and an encryption processor 340 for encrypting and decrypting data such as in relation to Secure Socket Layer (SSL) or Transport Layer Security (TLS) processing of data transmitted and received over one or more networks 206.

An operating system (not shown in FIG. 3) of the appliance 208 allocates, manages, or otherwise segregates the available system memory into the kernel space 308 and the user space 306. The kernel space 308 may be reserved for running a kernel 316, including any device drivers, kernel extensions or other kernel related software. As known to those skilled in the art, the kernel 316 is the core of the operating system, and provides access, control, and management of resources and hardware-related elements of the appliance 208. The kernel space 308 may also include a number of network services or processes working in conjunction with a cache manager 318.

The appliance 208 may include one or more network stacks 320, such as a TCP/IP based stack, for communicating with the client(s) 202, server(s) 204, network(s) 206, and/or other appliances 208, 212. For example, the appliance 208 may establish and/or terminate one or more transport layer connections between the client(s) 202 and the server(s) 204. Each network stack 320 may include a buffer for queuing one or more network packets for transmission by the appliance 208.

The kernel space 308 may include the cache manager 318, a packet engine 322, an encryption engine 324, a policy engine 326, and a compression engine 328. One or more of the processes 318, 322, 324, 326 and 328 may thus run in the core address space of the operating system of the appliance 208, which may reduce the number of data transactions to and from the memory and/or context switches between kernel mode and user mode, for example since data obtained in kernel mode may not need to be passed or copied to a user process, thread or user level data structure.

The cache manager 318 may duplicate original data stored elsewhere or data previously computed, generated or transmitted to reducing the access time of the data. In some embodiments, the cache memory may be a data object in the memory 312 of the appliance 208, or may be a physical memory having a faster access time than memory the 312.

The policy engine 326 may include a statistical engine or other configuration mechanism to allow a user to identify, specify, define, or configure a caching policy and access, control and management of objects, data or content being cached by the appliance 208, and define or configure security, network traffic, network access, compression or other functions performed by the appliance 208.

The encryption engine 324 may process any security related protocol, such as SSL or TLS. For example, the encryption engine 324 may encrypt and decrypt network packets, or any portion thereof, communicated via the appliance 208, may setup or establish SSL, TLS or other secure connections, for example, between the client(s) 202, the server(s) 204, and/or one or more other appliances 208, 212. In some embodiments, the encryption engine 324 may use a tunneling protocol to provide a VPN between a client 202 and a server 204. For example, in some embodiments, the encryption engine 324 may be in communication with the encryption processor 340. The compression engine 328 may compress network packets bi-directionally between the client(s) 202 and the server(s) 204 and/or between one or more of the appliances 208, 212.

The packet engine 322 may manage kernel-level processing of packets received and transmitted by the appliance 208 via the network stack(s) 320 to send and receive network packets via the network port(s) 314. The packet engine 322 may, for example, operate in conjunction with the encryption engine 324, the cache manager 318, the policy engine 326, and/or the compression engine 328 to perform encryption/decryption, traffic management such as request-level content switching and request-level cache redirection, and/or compression and decompression of data.

The user space 306 may be a memory area or portion of the operating system used by user mode applications or programs otherwise running in user mode. A user mode application may, for example, not access the kernel space 316 directly and may instead use service calls in order to access kernel services. As shown in FIG. 3, the user space 306 may, for example, include a graphical user interface (GUI) 330, a command line interface (CLI) 332, one or more shell services 334, one or more health monitoring programs 336, and/or one or more daemon services 338. The GUI 330 and/or the CLI 332 may enable a system administrator or other user to interact with and control the operation of the appliance 208, such as via the operating system of the appliance 208. The shell service(s) 334 may, for example, include programs, services, tasks, processes, and/or executable instructions to support interaction with the appliance 208 by a user via the GUI 330 and/or the CLI 332.

The health monitoring program(s) 336 may monitor, check, report and/or ensure that network systems are functioning properly and that users are receiving requested content over a network, for example, by monitoring activity of the appliance 208. In some embodiments, the health monitoring program(s) 336 may intercept and inspect any network traffic passed via the appliance 208. For example, the health monitor 336 may interface with one or more of the encryption engine 324, the cache manager 318, the policy engine 326, the compression engine 328, the packet engine 322, the daemon service(s) 338, and the shell service(s) 334 to determine a state, status, operating condition, and/or health of any portion of the appliance 208. Further, the health monitoring program(s) 336 may determine if a program, process, service and/or task is active and currently running, check status, error, and/or history logs provided by any program, process, service and/or task to determine any condition, status and/or error with any portion of the appliance 208. Additionally, the health monitoring program(s) 336 may measure and monitor the performance of any application, program, process, service, task, and/or thread executing on the appliance 208.

The daemon service(s) 338 are programs that run continuously or in the background and handle periodic service requests received by the appliance 208. In some embodiments, a daemon service 338 may, for example, forward such requests to other programs and/or processes, such as another daemon service 338, as appropriate.

As described herein, the appliance 208 may relieve the server(s) 204 of much of the processing load caused by repeatedly opening and closing transport layer connections to the client(s) 202 by opening one or more transport layer connections with each server 204 and maintaining these connections to allow repeated data accesses by the client(s) 202 via the Internet (e.g., "connection pooling"). To perform connection pooling, the appliance 208 may translate or multiplex communications by modifying sequence numbers and acknowledgment numbers at the transport layer protocol level (e.g., "connection multiplexing"). The appliance 208 may also provide switching and/or load balancing for communications between the client(s) 202 and the server(s) 204.

Figure 4:
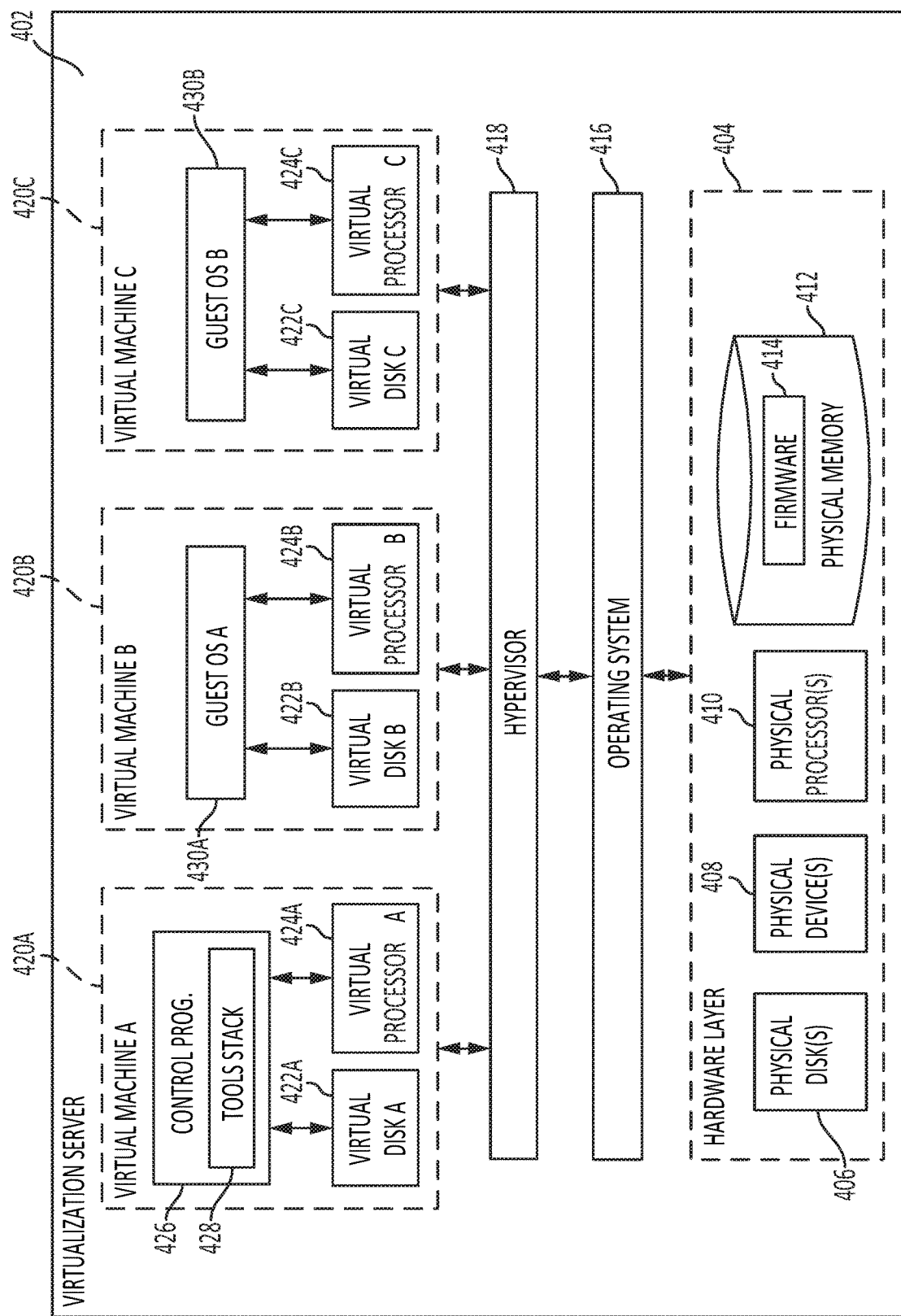
FIG. 4 is a block diagram illustrating components of an example embodiment of a server like that shown FIG. 2B.

D. Systems and Methods for Providing a Virtualized Application Delivery Controller FIG. 4 shows a high-level architecture of an illustrative application virtualization system. As shown, the application virtualization system may be single-server or multi-server system, or cloud system, including at least one virtualization server 402 configured to provide virtual desktops and/or virtual applications to one or more clients 202. As used herein, a desktop refers to a graphical environment or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

In the example shown, a computing device is configured as a virtualization server 402 in a virtualization environment, for example, a single-server, multi-server, or cloud computing environment. The virtualization server 402 illustrated in FIG. 4 may, for example, be deployed as and/or implemented by one or more embodiments of the server 204a illustrated in FIG. 2B or by other known computing devices. Included in the virtualization server 402 is a hardware layer 404 that may include one or more physical disks 406, one or more physical devices 408, one or more physical processors 410, and/or one or more physical memories 412. Programs or executable instructions stored in the physical memory 412 may be executed by the one or more processors 410 of virtualization server 402. In some embodiments, firmware 414 may be stored within a memory element in the physical memory 412 and may likewise be executed by one or more of the physical processors 410.

The virtualization server 402 may further include an operating system 416 that may be stored in a memory element in the physical memory 412 and executed by one or more of the physical processors 410. Still further, a hypervisor 418 may be stored in a memory element in the physical memory 412 and may be executed by one or more of the physical processors 410.

Executing on one or more of the physical processors 410 may be one or more virtual machines 420A-C (generally 420). As illustrated, each virtual machine 420 may have a virtual disk 422A-C and a virtual processor 424A-C. In some embodiments, a first virtual machine 420A may execute, using a virtual processor 424A, a control program 426 that includes a tools stack 428. The control program 426 may be referred to as a control virtual machine, Dom0, Domain 0, or other virtual machine used for system administration and/or control. In some embodiments, one or more of the virtual machines 420B-C may execute, using a virtual processor 424B-C, a guest operating system 430A-B.

The physical device(s) 408 may include, for example, a network interface card, a video card, a keyboard, a mouse, an input device, a monitor, a display device, speakers, an optical drive, a storage device, a universal serial bus connection, a printer, a scanner, a network element (e.g., router, firewall, network address translator, load balancer, virtual private network (VPN) gateway, Dynamic Host Configuration Protocol (DHCP) router, etc.), or any device connected to or communicating with virtualization server 402. The physical memory 412 in the hardware layer 404 may include any type of memory. The physical memory 412 may store data, and in some embodiments may store one or more programs, or sets of executable instructions.

In some embodiments, the hypervisor 418 may be a program executed by one or more of the processors 410 to create and manage any number of the virtual machines 420. The hypervisor 418 may be referred to as a virtual machine monitor, or platform virtualization software. In some embodiments, the hypervisor 418 can be any combination of executable instructions and hardware that monitors virtual machines executing on a computing machine. The hypervisor 418 may, for example, be a Type 2 hypervisor, where the hypervisor executes within the operating system 416 executing on the virtualization server 402. The virtual machine(s) 420 may then execute at a level above the hypervisor 418. In some embodiments, the Type 2 hypervisor 418 may execute within the context of a user's operating system such that the Type 2 hypervisor interacts with the user's operating system. In other embodiments, one or more virtualization servers 402 in a virtualization environment may instead include a Type 1 hypervisor (not shown). A Type 1 hypervisor may, for example, execute on the virtualization server 402 by directly accessing the hardware and resources within the hardware layer 404. That is, while a Type 2 hypervisor 418 accesses system resources through a host operating system 416, as shown, a Type 1 hypervisor may directly access all system resources without the host operating system 416. A Type 1 hypervisor may thus execute directly on one or more physical processors 410 of the virtualization server 402, and may include program data stored in the physical memory 412.

The hypervisor 418, in some embodiments, may provide virtual resources to the operating system(s) 430 or control program(s) 426 executing on the virtual machine(s) 420 in any manner that simulates the operating systems 430 or control programs 426 having direct access to system resources. System resources may include, but are not limited to, the physical device(s) 408, the physical disk(s) 406, the physical processor(s) 410, the physical memory 412, and/or any other component included in virtualization server 402 hardware layer 404. The hypervisor 418 may, for example, be used to emulate virtual hardware, partition physical hardware, virtualize physical hardware, and/or execute virtual machines that provide access to computing environments. In some embodiments, the virtualization server 402 may execute a hypervisor 418 that creates a virtual machine platform on which guest operating systems may execute. In such embodiments, the virtualization server 402 may be referred to as a host server. An example of such a virtualization server is the Citrix Hypervisor™ provided by Citrix Systems, Inc., of Fort Lauderdale, Fla.

As noted above, the hypervisor 418 may create one or more of the virtual machines 420B-C in which the guest operating systems 430 execute. In some embodiments, the hypervisor 418 may load a virtual machine image to create a virtual machine 420. In other embodiments, the hypervisor 418 may execute a guest operating system 430 within a virtual machine 420. In still other embodiments, a virtual machine 420 may execute a guest operating system 430.

In addition to creating virtual machines 420, the hypervisor 418 may control the execution of at least one virtual machine 420. In other embodiments, the hypervisor 418 may present at least one virtual machine 420 with an abstraction of at least one hardware resource provided by the virtualization server 402 (e.g., any hardware resource available within the hardware layer 404). In other embodiments, the hypervisor 418 may control the manner in which the virtual machines 420 access the physical processor(s) 410 available in the virtualization server 402. Controlling access to the physical processor(s) 410 may include determining whether a virtual machine 420 should have access to a processor 410, and how physical processor capabilities are presented to the virtual machine 420.

In some embodiments, VMs 420 may be implemented as fully virtualized VMs that are not aware that they are virtual machines (e.g., a Hardware Virtual Machine or HVM). In other embodiments, the VM may be aware that it is a virtual machine, and/or the VM may be implemented as a paravirtualized (PV) VM.

Each of the virtual machines 420 may be implemented by way of a set of executable instructions that, when executed by a processor 410, may imitate the operation of a physical computer such that the virtual machine 420 can execute programs and processes much like a physical computing device. While FIG. 4 illustrates an embodiment in which a virtualization server 402 hosts three virtual machines 420, in other embodiments the virtualization server 402 can host any number of virtual machines 420. The hypervisor 418, in some embodiments, may provide each virtual machine 420 with a unique virtual view of the physical hardware, memory, processor, and other system resources available to that virtual machine 420. In some embodiments, the unique virtual view can be based on one or more of virtual machine permissions, application of a policy engine to one or more virtual machine identifiers, a user accessing a virtual machine, the applications executing on a virtual machine, networks accessed by a virtual machine, or any other desired criteria. For instance, the hypervisor 418 may create one or more unsecure virtual machines 420 and one or more secure virtual machines 420. Unsecure virtual machines 420 may be prevented from accessing resources, hardware, memory locations, and programs that secure virtual machines 420 may be permitted to access. In other embodiments, the hypervisor 418 may provide each virtual machine 420 with a substantially similar virtual view of the physical hardware, memory, processor, and other system resources available to the virtual machines 420.

The virtual disk(s) 422, in some embodiments, provide a virtualized view of one or more of the physical disks 406 of the virtualization server 402, or a portion of one or more of the physical disks 406. The virtualized view of the physical disk(s) 406 may be generated, provided, and/or managed by the hypervisor 418. In some embodiments, the hypervisor 418 may provide each virtual machine 420 with a unique view of the physical disk(s) 406. Thus, in such embodiments, the particular virtual disk 422 included in each virtual machine 420 may be unique when compared with the other virtual disks 422.

In some embodiments, each virtual processor 424 may provide a virtualized view of one or more of the physical processors 410 of the virtualization server 402. In some embodiments, the virtualized view of the physical processor(s) 410 may be generated, provided, and/or managed by the hypervisor 418. In some embodiments, one or more of the virtual processors 424 may have substantially all of the same characteristics of at least one of the physical processors 410. In other embodiments, one or more of the virtual processors 424 may provide a modified view of a physical processor 410 such that at least some of the characteristics of the virtual processor 424 are different than the characteristics of the corresponding physical processor 410.

Although shown in FIG. 4 as including a single virtualized device 402, a virtualized environment may be provided by a plurality of networked devices in a system in which at least one physical host executes a virtual machine. A device on which a VM executes may be referred to as a physical host and/or a host machine. For example, an appliance 208 may be additionally or alternatively implemented in a virtualized environment on any computing device, such as a client 202, a server 204, or an appliance 208. Such virtual appliances may, for example, provide functionality for availability, performance, health monitoring, caching and compression, connection multiplexing and pooling and/or security processing (e.g., firewall, VPN, encryption/decryption, etc.), similarly as described in regard to the appliance 208.

In some embodiments, a server may execute multiple virtual machines 420, for example, on various cores of a multi-core processing system and/or various processors of a multiple processor device. For example, one or more of the processors 248 shown in FIG. 2D may be implemented as either single- or multi-core processors to provide a multi-threaded, parallel architecture and/or multi-core architecture. Each processor and/or core may have or use memory that is allocated or assigned for private or local use that is only accessible by that processor/core, and/or may have or use memory that is public or shared and accessible by multiple processors/cores. Such architectures may allow work, task, load or network traffic distribution across one or more processors and/or one or more cores (e.g., by functional parallelism, data parallelism, flow-based data parallelism, etc.).

Further, instead of (or in addition to) the functionality of the cores being implemented in the form of a physical processor/core, such functionality may be implemented in a virtualized environment on a client 202, server 204 or appliance 208, 212, such that the functionality may be implemented across multiple devices, such as a cluster of computing devices, a server farm or network of computing devices, etc. The various processors/cores may interface or communicate with each other using a variety of interface techniques, such as core to core messaging, shared memory, kernel APIs, etc.

In embodiments employing multiple processors and/or multiple processor cores, described embodiments may distribute data packets among cores or processors, for example to balance the flows across the cores. For example, packet distribution may be based upon determinations of functions performed by each core, source and destination addresses, and/or whether: a load on the associated core is above a predetermined threshold; the load on the associated core is below a predetermined threshold; the load on the associated core is less than the load on the other cores; or any other metric that can be used to determine where to forward data packets based in part on the amount of load on a processor.

For example, data packets may be distributed among cores or processes using receive-side scaling (RSS) in order to process packets using multiple processors/cores in a network. RSS generally allows packet processing to be balanced across multiple processors/cores while maintaining in-order delivery of the packets. In some embodiments, RSS may use a hashing scheme to determine a core or processor for processing a packet.

The RSS may generate hashes from any type and form of input, such as a sequence of values. This sequence of values can include any portion of the network packet, such as any header, field or payload of network packet, and include any tuples of information associated with a network packet or data flow, such as addresses and ports. The hash result or any portion thereof may be used to identify a processor, core, engine, etc., for distributing a network packet, for example via a hash table, indirection table, or other mapping technique.

E. Systems and Methods for Providing File Sharing Over Network(s)

Figure 5A:
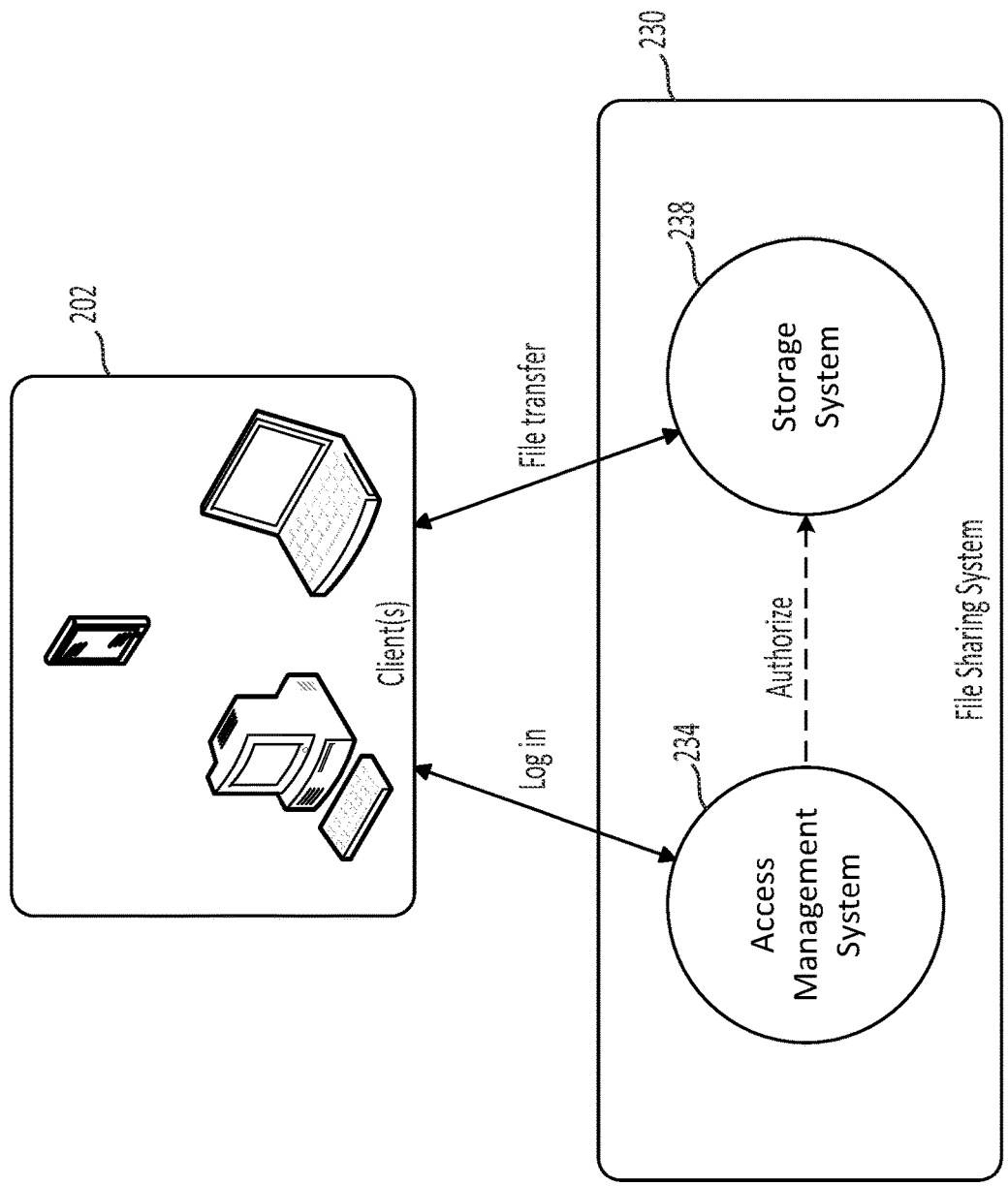
FIG. 5A is a diagram illustrating certain operations that may be performed by the file sharing system shown in FIG. 2C in accordance with some embodiments.

As discussed above in connection with FIG. 2C, in some embodiments, a file sharing system may be distributed between two sub-systems, with one subsystem (e.g., the access management system 234) being responsible for controlling access to files 228 stored in the other subsystem (e.g., the storage system 238). FIG. 5A illustrates conceptually how one or more clients 202 may interact with two such subsystems. ShareFile®, offered by Citrix Systems, Inc., of Fort Lauderdale, Fla., is one example of such a file sharing system.

As shown in FIG. 5A, an authorized user operating a client 202, which may take on any of numerous forms, may log in to the access management system 234, for example, by entering a valid user name and password. In some embodiments, the access management system 234 may include one or more webservers that respond to requests from the client 202. The access management system 234 may store metadata concerning the identity and arrangements of files 228 (shown in FIG. 2C) stored by the storage system 238, such as folders maintained by the storage system 238 and any files 228 contained within such folders. In some embodiments, the metadata may also include permission metadata identifying the folders and files 228 each user is allowed to access. Once logged in, the user may employ a user-interface mechanism of the client 202 to navigate among folders for which the metadata indicates the user has access permission.

In some embodiments, the logged-in user may select a particular file 228 the user wants to access and/or to which the logged-in user wants a different user of a different client 202 to be able to access. Upon receiving such a selection from a client 202, the access management system 234 may take steps to authorize access to the selected file 228 by the logged-in client 202 and/or the different client 202. In some embodiments, for example, the access management system 234 may interact with the storage system 238 to obtain a unique "download" token which may subsequently be used by a client 202 to retrieve the identified file 228 from the storage system 238. The access management system 234 may, for example, send the download token to the logged-in client 202 and/or a client 202 operated by a different user. In some embodiments, the download token may a single-use token that expires after its first use.

In some embodiments, the storage system 238 may also include one or more webservers and may respond to requests from clients 202. In such embodiments, one or more files 228 may be transferred from the storage system 238 to a client 202 in response to a request that includes the download token. In some embodiments, for example, the download token may be appended to a URL that resolves to an IP address of the webserver(s) of the storage system 238. Access to a given file 228 may thus, for example, be enabled by a "download link" that includes the URL/token. Such a download link may, for example, be sent the logged-in client 202 in the form of a "DOWNLOAD" button or other user-interface element the user can select to effect the transfer of the file 228 from the storage system 238 to the client 202. Alternatively, the download link may be sent to a different client 202 operated by an individual with which the logged-in user desires to share the file 228. For example, in some embodiments, the access management system 234 may send an email or other message to the different client 202 that includes the download link in the form of a "DOWNLOAD" button or other user-interface element, or simply with a message indicating "Click Here to Download" or the like. In yet other embodiments, the logged-in client 202 may receive the download link from the access management system 234 and cut-and-paste or otherwise copy the download link into an email or other message the logged in user can then send to the other client 202 to enable the other client 202 to retrieve the file 228 from the storage system 238.

In some embodiments, a logged-in user may select a folder on the file sharing system to which the user wants to transfer one or more files 228 (shown in FIG. 2C) from the logged-in client 202, or to which the logged-in user wants to allow a different user of a different client 202 to transfer one or more files 228. Additionally or alternatively, the logged-in user may identify one or more different users (e.g., by entering their email addresses) the logged-in user wants to be able to access one or more files 228 currently accessible to the logged-in client 202.

Similar to the file downloading process described above, upon receiving such a selection from a client 202, the access management system 234 may take steps to authorize access to the selected folder by the logged-in client 202 and/or the different client 202. In some embodiments, for example, the access management system 234 may interact with the storage system 238 to obtain a unique "upload token" which may subsequently be used by a client 202 to transfer one or more files 228 from the client 202 to the storage system 238. The access management system 234 may, for example, send the upload token to the logged-in client 202 and/or a client 202 operated by a different user.

One or more files 228 may be transferred from a client 202 to the storage system 238 in response to a request that includes the upload token. In some embodiments, for example, the upload token may be appended to a URL that resolves to an IP address of the webserver(s) of the storage system 238. For example, in some embodiments, in response to a logged-in user selecting a folder to which the user desires to transfer one or more files 228 and/or identifying one or more intended recipients of such files 228, the access management system 234 may return a webpage requesting that the user drag-and-drop or otherwise identify the file(s) 228 the user desires to transfer to the selected folder and/or a designated recipient. The returned webpage may also include an "upload link," e.g., in the form of an "UPLOAD" button or other user-interface element that the user can select to effect the transfer of the file(s) 228 from the client 202 to the storage system 238.

In some embodiments, in response to a logged-in user selecting a folder to which the user wants to enable a different client 202 operated by a different user to transfer one or more files 228, the access management system 234 may generate an upload link that may be sent to the different client 202. For example, in some embodiments, the access management system 234 may send an email or other message to the different client 202 that includes a message indicating that the different user has been authorized to transfer one or more files 228 to the file sharing system, and inviting the user to select the upload link to effect such a transfer. Section of the upload link by the different user may, for example, generate a request to webserver(s) in the storage system and cause a webserver to return a webpage inviting the different user to drag-and-drop or otherwise identify the file(s) 228 the different user wishes to upload to the file sharing system 230. The returned webpage may also include a user-interface element, e.g., in the form of an "UPLOAD" button, that the different user can select to effect the transfer of the file(s) 228 from the client 202 to the storage system 238. In other embodiments, the logged-in user may receive the upload link from the access management system 234 and may cut-and-paste or otherwise copy the upload link into an email or other message the logged-in user can then send to the different client 202 to enable the different client to upload one or more files 228 to the storage system 238.

In some embodiments, in response to one or more files 228 being uploaded to a folder, the storage system 238 may send a message to the access management system 234 indicating that the file(s) 228 have been successfully uploaded, and an access management system 234 may, in turn, send an email or other message to one or more users indicating the same. For user's that have accounts with the file sharing system 230, for example, a message may be sent to the account holder that includes a download link that the account holder can select to effect the transfer of the file 228 from the storage system 238 to the client 202 operated by the account holder. Alternatively, the message to the account holder may include a link to a webpage from the access management system 234 inviting the account holder to log in to retrieve the transferred files 228. Likewise, in circumstances in which a logged-in user identifies one or more intended recipients for one or more to-be-uploaded files 228 (e.g., by entering their email addresses), the access management system 234 may send a message including a download link to the designated recipients (e.g., in the manner described above), which such designated recipients can then use to effect the transfer of the file(s) 228 from the storage system 238 to the client(s) 202 operated by those designated recipients.

Figure 5B:
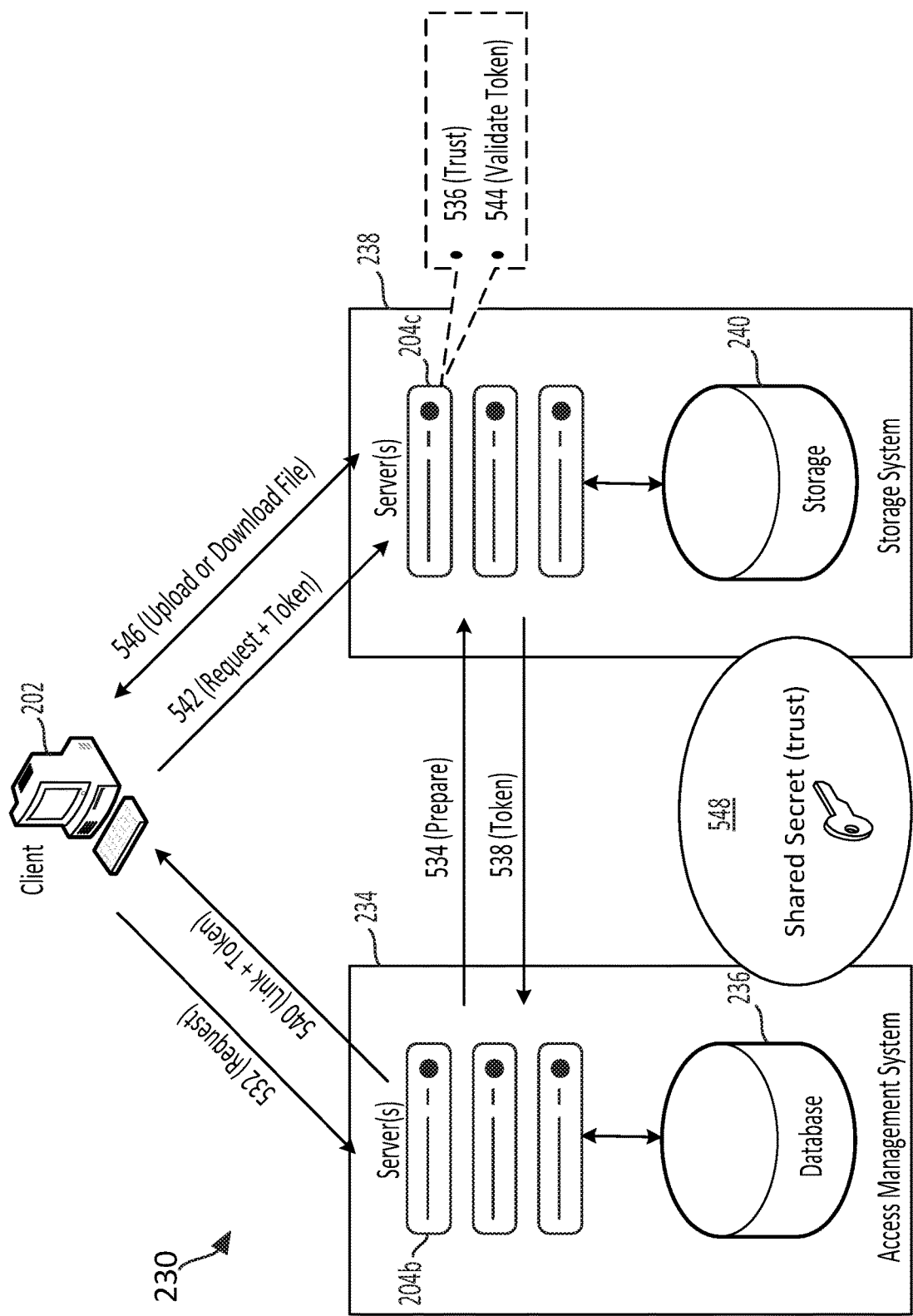
FIG. 5B is a diagram illustrating additional operations that may be performed by the file sharing system shown in FIG. 2C in accordance with some embodiments.

FIG. 5B is a block diagram showing an example of a process for generating access tokens (e.g., the upload tokens and download tokens discussed above) within the file sharing system 230 described in connection with FIGS. 2C and 5A.

As shown, in some embodiments, a logged-in client 202 may initiate the access token generation process by sending an access request 532 to the access management server(s) 204b. As noted above, the access request 532 may, for example, correspond to one or more of (A) a request to enable the downloading of one or more files 228 (shown in FIG. 2C) from the storage system 238 to the logged-in client 202, (B) a request to enable the downloading of one or more files 228 from the storage system 238 to a different client 202 operated by a different user, (C) request to enable the uploading of one or more files 228 from a logged-in client 202 to a folder on the storage system 238, (D) a request to enable the uploading of one or more files 228 from a different client 202 operated by a different user to a folder of the storage system 238, (E) a request to enable the transfer of one or more files 228, via the storage system 238, from a logged-in client 202 to a different client 202 operated by a different user, or (F) a request to enable the transfer of one or more files 228, via the storage system 238, from a different client 202 operated by a different user to a logged-in client 202.

In response to receiving the access request 532, an access management server 204*b* may send a "prepare" message 534 to the storage control server(s) 204*c* of the storage system 238, identifying the type of action indicated in the request, as well as the identity and/or location within the storage medium 240 of any applicable folders and/or files 228. As shown, in some embodiments, a trust relationship may be established (step 536) between the storage control server(s) 204*c* and the access management server(s) 204*b*. In some embodiments, for example, the storage control server(s) 204*c* may establish the trust relationship by validating a hash-based message authentication code (HMAC) based on shared secret or key 548).

After the trust relationship has been established, the storage control server(s) 204*c* may generate and send (step 538) to the access management server(s) 204*b* a unique upload token and/or a unique download token, such as those as discussed above.

After the access management server(s) 204*b* receive a token from the storage control server(s) 204*c*, the access management server(s) 204*b* may prepare and send a link 340 including the token to one or more client(s) 202. In some embodiments, for example, the link may contain a fully qualified domain name (FQDN) of the storage control server(s) 204*c*, together with the token. As discussed above, the link 340 may be sent to the logged-in client 202 and/or to a different client 202 operated by a different user, depending on the operation that was indicated by the request.

The client(s) 202 that receive the token may thereafter send a request 542 (which includes the token) to the storage control server(s) 204*c*. In response to receiving the request, the storage control server(s) 204*c* may validate (step 544) the token and, if the validation is successful, the storage control server(s) 204*c* may interact with the client(s) 202 to effect the transfer (step 546) of the pertinent file(s) 228, as discussed above.

Figure 6A:
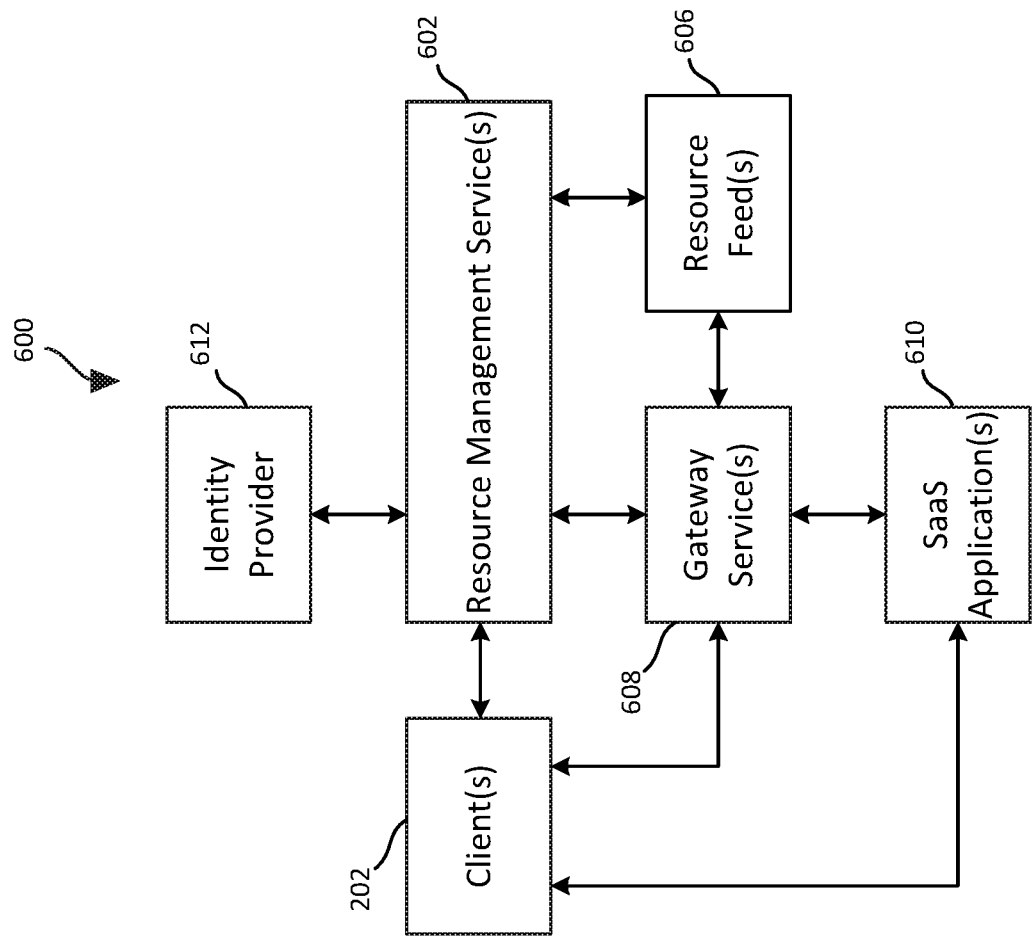
FIG. 6A is a block diagram of an example system in which resource management services may manage and streamline access by clients to resource feeds (via one or more gateway services) and/or software-as-a-service (SaaS) applications.

F. Systems and Methods for Managing and Streamlining Access by Client Devices to a Variety of Resources FIG. 6A is a block diagram of an example system 600 in which one or more resource management services 602 may manage and streamline access by one or more clients 202 to one or more resource feeds 606 (via one or more gateway services 608) and/or one or more software-as-a-service (SaaS) applications 610. In particular, the resource management service(s) 602 may employ an identity provider 612 to authenticate the identity of a user of a client 202 and, following authentication, identify one of more resources the user is authorized to access. In response to the user selecting one of the identified resources, the resource management service(s) 602 may send appropriate access credentials to the requesting client 202, and the client 202 may then use those credentials to access the selected resource. For the resource feed(s) 606, the client 202 may use the supplied credentials to access the selected resource via a gateway service 608. For the SaaS application(s) 610, the client 202 may use the credentials to access the selected application directly.

The client(s) 202 may be any type of computing devices capable of accessing the resource feed(s) 606 and/or the SaaS application(s) 610, and may, for example, include a variety of desktop or laptop computers, smartphones, tablets, etc. The resource feed(s) 606 may include any of numerous resource types and may be provided from any of numerous locations. In some embodiments, for example, the resource feed(s) 606 may include one or more systems or services for providing virtual applications and/or desktops to the client(s) 202, one or more file repositories and/or file sharing systems, one or more secure browser services, one or more access control services for the SaaS applications 610, one or more management services for local applications on the client(s) 202, one or more internet enabled devices or sensors, etc. Each of the resource management service(s) 602, the resource feed(s) 606, the gateway service(s) 608, the SaaS application(s) 610, and the identity provider 612 may be located within an on-premises data center of an organization for which the system 600 is deployed, within one or more cloud computing environments, or elsewhere.

Figure 6B:
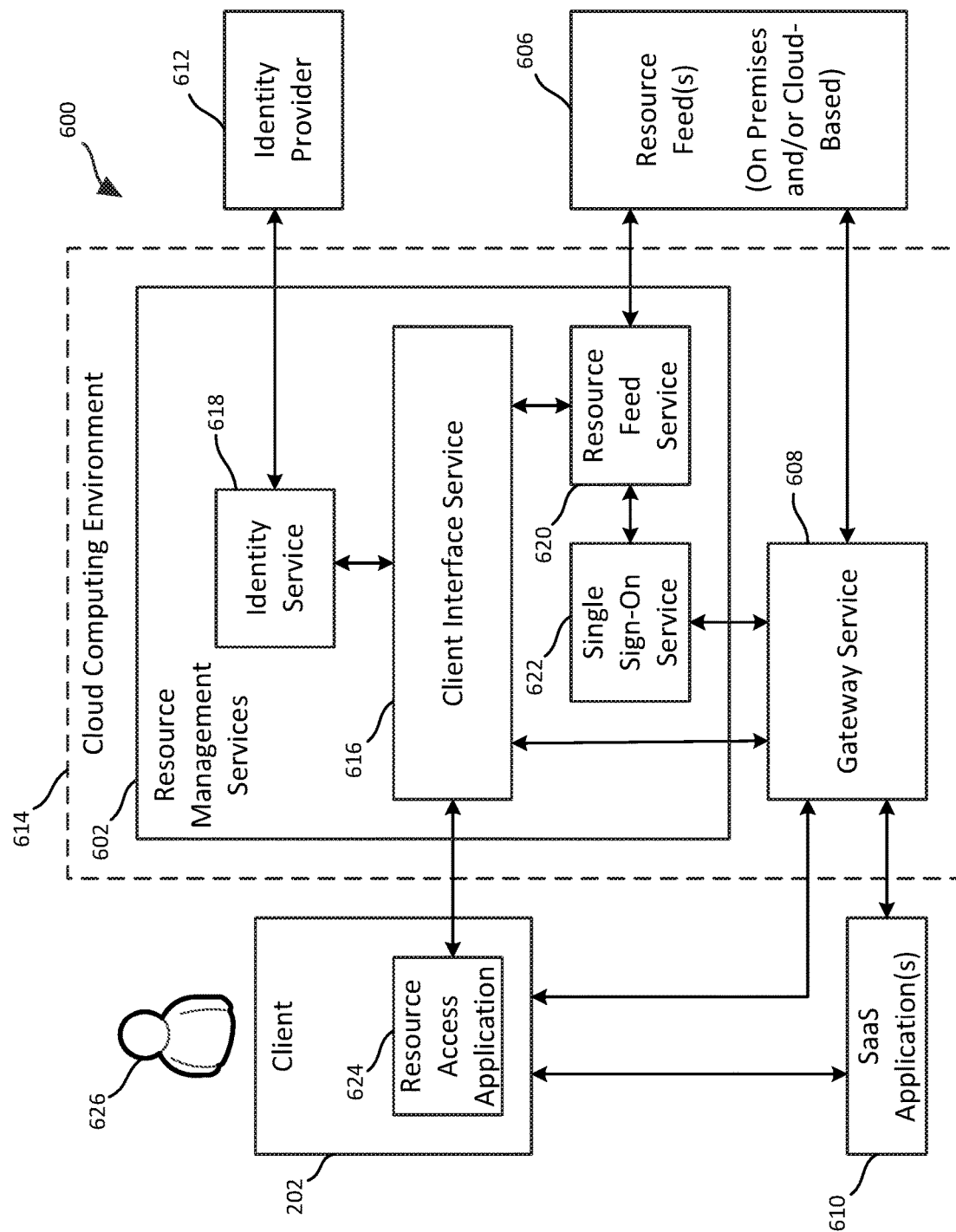
FIG. 6B is a block diagram showing an example implementation of the system shown in FIG. 6A in which various resource management services as well as a gateway service are located within a cloud computing environment.

FIG. 6B is a block diagram showing an example implementation of the system 600 shown in FIG. 6A in which various resource management services 602 as well as a gateway service 608 are located within a cloud computing environment 614. The cloud computing environment may, for example, include Microsoft Azure Cloud, Amazon Web Services, Google Cloud, or IBM Cloud.

For any of illustrated components (other than the client 202) that are not based within the cloud computing environment 614, cloud connectors (not shown in FIG. 6B) may be used to interface those components with the cloud computing environment 614. Such cloud connectors may, for example, run on Windows Server instances hosted in resource locations and may create a reverse proxy to route traffic between the site(s) and the cloud computing environment 614. In the illustrated example, the cloud-based resource management services 602 include a client interface service 616, an identity service 618, a resource feed service 620, and a single sign-on service 622. As shown, in some embodiments, the client 202 may use a resource access application 624 to communicate with the client interface service 616 as well as to present a user interface on the client 202 that a user 626 can operate to access the resource feed(s) 606 and/or the SaaS application(s) 610. The resource access application 624 may either be installed on the client 202, or may be executed by the client interface service 616 (or elsewhere in the system 600) and accessed using a web browser (not shown in FIG. 6B) on the client 202.

As explained in more detail below, in some embodiments, the resource access application 624 and associated components may provide the user 626 with a personalized, all-in-one interface enabling instant and seamless access to all the user's SaaS and web applications, files, virtual Windows applications, virtual Linux applications, desktops, mobile applications, Citrix Virtual Apps and Desktops™, local applications, and other data.

When the resource access application 624 is launched or otherwise accessed by the user 626, the client interface service 616 may send a sign-on request to the identity service 618. In some embodiments, the identity provider 612 may be located on the premises of the organization for which the system 600 is deployed. The identity provider 612 may, for example, correspond to an on-premises Windows Active Directory. In such embodiments, the identity provider 612 may be connected to the cloud-based identity service 618 using a cloud connector (not shown in FIG. 6B), as described above. Upon receiving a sign-on request, the identity service 618 may cause the resource access application 624 (via the client interface service 616) to prompt the user 626 for the user's authentication credentials (e.g., user-name and password). Upon receiving the user's authentication credentials, the client interface service 616 may pass the credentials along to the identity service 618, and the identity service 618 may, in turn, forward them to the identity provider 612 for authentication, for example, by comparing them against an Active Directory domain. Once the identity service 618 receives confirmation from the identity provider 612 that the user's identity has been properly authenticated, the client interface service 616 may send a request to the resource feed service 620 for a list of subscribed resources for the user 626.

In other embodiments (not illustrated in FIG. 6B), the identity provider 612 may be a cloud-based identity service, such as a Microsoft Azure Active Directory. In such embodiments, upon receiving a sign-on request from the client interface service 616, the identity service 618 may, via the client interface service 616, cause the client 202 to be redirected to the cloud-based identity service to complete an authentication process. The cloud-based identity service may then cause the client 202 to prompt the user 626 to enter the user's authentication credentials. Upon determining the user's identity has been properly authenticated, the cloud-based identity service may send a message to the resource access application 624 indicating the authentication attempt was successful, and the resource access application 624 may then inform the client interface service 616 of the successfully authentication. Once the identity service 618 receives confirmation from the client interface service 616 that the user's identity has been properly authenticated, the client interface service 616 may send a request to the resource feed service 620 for a list of subscribed resources for the user 626.

For each configured resource feed, the resource feed service 620 may request an identity token from the single sign-on service 622. The resource feed service 620 may then pass the feed-specific identity tokens it receives to the points of authentication for the respective resource feeds 606. Each resource feed 606 may then respond with a list of resources configured for the respective identity. The resource feed service 620 may then aggregate all items from the different feeds and forward them to the client interface service 616, which may cause the resource access application 624 to present a list of available resources on a user interface of the client 202. The list of available resources may, for example, be presented on the user interface of the client 202 as a set of selectable icons or other elements corresponding to accessible resources. The resources so identified may, for example, include one or more virtual applications and/or desktops (e.g., Citrix Virtual Apps and Desktops™, VMware Horizon, Microsoft RDS, etc.), one or more file repositories and/or file sharing systems (e.g., Sharefile®, one or more secure browsers, one or more internet enabled devices or sensors, one or more local applications installed on the client 202, and/or one or more SaaS applications 610 to which the user 626 has subscribed. The lists of local applications and the SaaS applications 610 may, for example, be supplied by resource feeds 606 for respective services that manage which such applications are to be made available to the user 626 via the resource access application 624. Examples of SaaS applications 610 that may be managed and accessed as described herein include Microsoft Office 365 applications, SAP SaaS applications, Workday applications, etc.

For resources other than local applications and the SaaS application(s) 610, upon the user 626 selecting one of the listed available resources, the resource access application 624 may cause the client interface service 616 to forward a request for the specified resource to the resource feed service 620. In response to receiving such a request, the resource feed service 620 may request an identity token for the corresponding feed from the single sign-on service 622. The resource feed service 620 may then pass the identity token received from the single sign-on service 622 to the client interface service 616 where a launch ticket for the resource may be generated and sent to the resource access application 624. Upon receiving the launch ticket, the resource access application 624 may initiate a secure session to the gateway service 608 and present the launch ticket. When the gateway service 608 is presented with the launch ticket, it may initiate a secure session to the appropriate resource feed and present the identity token to that feed to seamlessly authenticate the user 626. Once the session initializes, the client 202 may proceed to access the selected resource.

When the user 626 selects a local application, the resource access application 624 may cause the selected local application to launch on the client 202. When the user 626 selects a SaaS application 610, the resource access application 624 may cause the client interface service 616 request a one-time uniform resource locator (URL) from the gateway service 608 as well a preferred browser for use in accessing the SaaS application 610. After the gateway service 608 returns the one-time URL and identifies the preferred browser, the client interface service 616 may pass that information along to the resource access application 624. The client 202 may then launch the identified browser and initiate a connection to the gateway service 608. The gateway service 608 may then request an assertion from the single sign-on service 622. Upon receiving the assertion, the gateway service 608 may cause the identified browser on the client 202 to be redirected to the logon page for identified SaaS application 610 and present the assertion. The SaaS may then contact the gateway service 608 to validate the assertion and authenticate the user 626. Once the user has been authenticated, communication may occur directly between the identified browser and the selected SaaS application 610, thus allowing the user 626 to use the client 202 to access the selected SaaS application 610.

In some embodiments, the preferred browser identified by the gateway service 608 may be a specialized browser embedded in the resource access application 624 (when the resource application is installed on the client 202) or provided by one of the resource feeds 606 (when the resource application 624 is located remotely), e.g., via a secure browser service. In such embodiments, the SaaS applications 610 may incorporate enhanced security policies to enforce one or more restrictions on the embedded browser. Examples of such policies include (1) requiring use of the specialized browser and disabling use of other local browsers, (2) restricting clipboard access, e.g., by disabling cut/copy/paste operations between the application and the clipboard, (3) restricting printing, e.g., by disabling the ability to print from within the browser, (3) restricting navigation, e.g., by disabling the next and/or back browser buttons, (4) restricting downloads, e.g., by disabling the ability to download from within the SaaS application, and (5) displaying watermarks, e.g., by overlaying a screen-based watermark showing the username and IP address associated with the client 202 such that the watermark will appear as displayed on the screen if the user tries to print or take a screenshot. Further, in some embodiments, when a user selects a hyperlink within a SaaS application, the specialized browser may send the URL for the link to an access control service (e.g., implemented as one of the resource feed(s) 606) for assessment of its security risk by a web filtering service. For approved URLs, the specialized browser may be permitted to access the link. For suspicious links, however, the web filtering service may have the client interface service 616 send the link to a secure browser service, which may start a new virtual browser session with the client 202, and thus allow the user to access the potentially harmful linked content in a safe environment.

In some embodiments, in addition to or in lieu of providing the user 626 with a list of resources that are available to be accessed individually, as described above, the user 626 may instead be permitted to choose to access a streamlined feed of event notifications and/or available actions that may be taken with respect to events that are automatically detected with respect to one or more of the resources. This streamlined resource activity feed, which may be customized for each user 626, may allow users to monitor important activity involving all of their resources—SaaS applications, web applications, Windows applications, Linux applications, desktops, file repositories and/or file sharing systems, and other data through a single interface, without needing to switch context from one resource to another. Further, event notifications in a resource activity feed may be accompanied by a discrete set of user-interface elements, e.g., "approve," "deny," and "see more detail" buttons, allowing a user to take one or more simple actions with respect to each event right within the user's feed. In some embodiments, such a streamlined, intelligent resource activity feed may be enabled by one or more micro-applications, or "microapps," that can interface with underlying associated resources using APIs or the like. The responsive actions may be user-initiated activities that are taken within the microapps and that provide inputs to the underlying applications through the API or other interface. The actions a user performs within the microapp may, for example, be designed to address specific common problems and use cases quickly and easily, adding to increased user productivity (e.g., request personal time off, submit a help desk ticket, etc.). In some embodiments, notifications from such event-driven microapps may additionally or alternatively be pushed to clients 202 to notify a user 626 of something that requires the user's attention (e.g., approval of an expense report, new course available for registration, etc.).

Figure 6C:
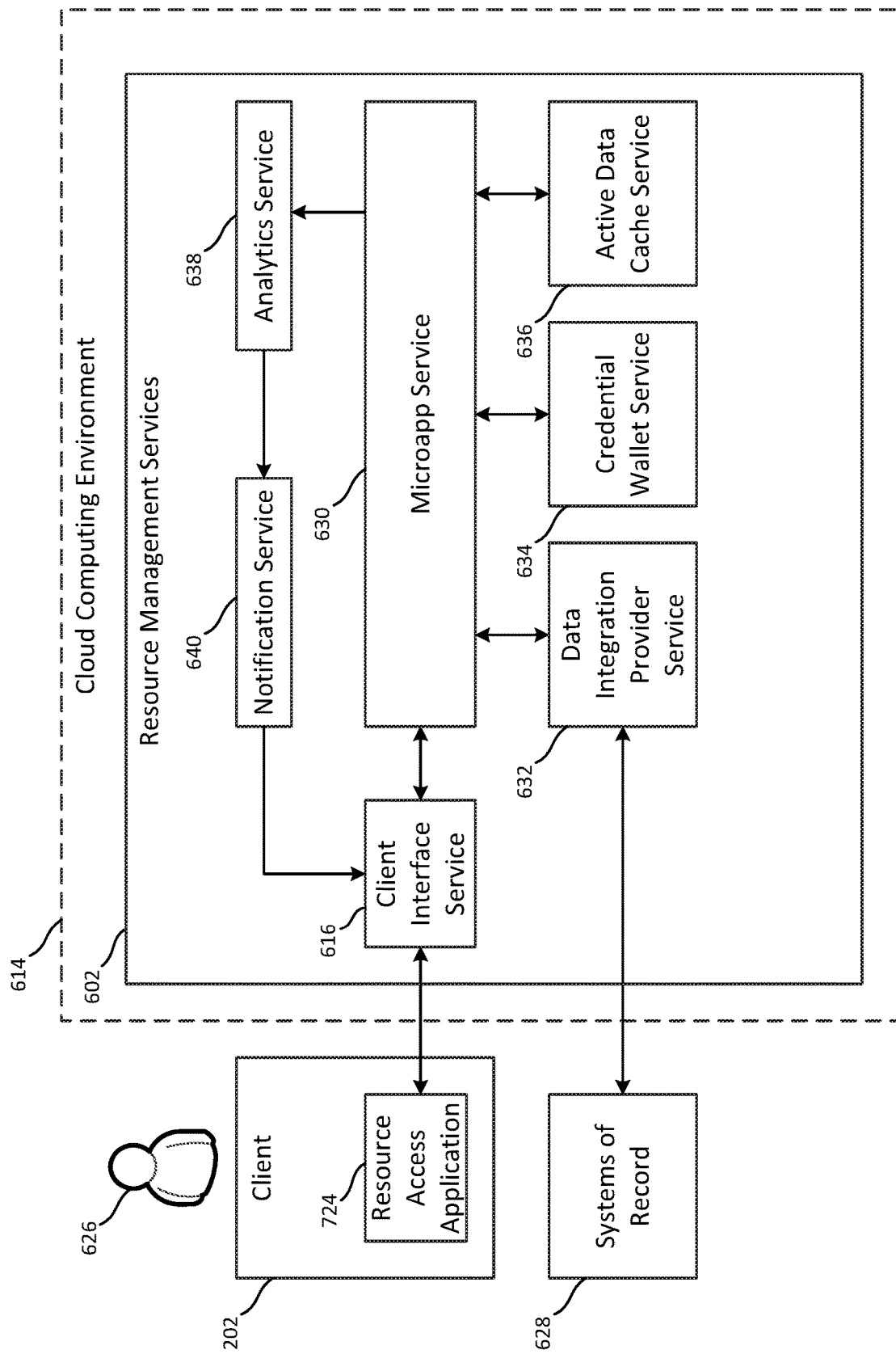
FIG. 6C is a block diagram similar to that shown in FIG. 6B but in which the available resources are represented by a single box labeled "systems of record," and further in which several different services are included among the resource management services.

FIG. 6C is a block diagram similar to that shown in FIG. 6B but in which the available resources (e.g., SaaS applications, web applications, Windows applications, Linux applications, desktops, file repositories and/or file sharing systems, and other data) are represented by a single box 628 labeled "systems of record," and further in which several different services are included within the resource management services block 602. As explained below, the services shown in FIG. 6C may enable the provision of a streamlined resource activity feed and/or notification process for a client 202. In the example shown, in addition to the client interface service 616 discussed above, the illustrated services include a microapp service 630, a data integration provider service 632, a credential wallet service 634, an active data cache service 636, an analytics service 638, and a notification service 640. In various embodiments, the services shown in FIG. 6C may be employed either in addition to or instead of the different services shown in FIG. 6B.

In some embodiments, a microapp may be a single use case made available to users to streamline functionality from complex enterprise applications. Microapps may, for example, utilize APIs available within SaaS, web, or homegrown applications allowing users to see content without needing a full launch of the application or the need to switch context. Absent such microapps, users would need to launch an application, navigate to the action they need to perform, and then perform the action. Microapps may streamline routine tasks for frequently performed actions and provide users the ability to perform actions within the resource access application 624 without having to launch the native application. The system shown in FIG. 6C may, for example, aggregate relevant notifications, tasks, and insights, and thereby give the user 626 a dynamic productivity tool. In some embodiments, the resource activity feed may be intelligently populated by utilizing machine learning and artificial intelligence (AI) algorithms. Further, in some implementations, microapps may be configured within the cloud computing environment 614, thus giving administrators a powerful tool to create more productive workflows, without the need for additional infrastructure. Whether pushed to a user or initiated by a user, microapps may provide short cuts that simplify and streamline key tasks that would otherwise require opening full enterprise applications. In some embodiments, out-of-the-box templates may allow administrators with API account permissions to build microapp solutions targeted for their needs. Administrators may also, in some embodiments, be provided with the tools they need to build custom microapps.

Referring to FIG. 6C, the systems of record 628 may represent the applications and/or other resources the resource management services 602 may interact with to create microapps. These resources may be SaaS applications, legacy applications, or homegrown applications, and can be hosted on-premises or within a cloud computing environment. Connectors with out-of-the-box templates for several applications may be provided and integration with other applications may additionally or alternatively be configured through a microapp page builder. Such a microapp page builder may, for example, connect to legacy, on-premises, and SaaS systems by creating streamlined user workflows via microapp actions. The resource management services 602, and in particular the data integration provider service 632, may, for example, support REST API, JSON, OData-JSON, and 6ML. As explained in more detail below, the data integration provider service 632 may also write back to the systems of record, for example, using OAuth2 or a service account.

In some embodiments, the microapp service 630 may be a single-tenant service responsible for creating the microapps. The microapp service 630 may send raw events, pulled from the systems of record 628, to the analytics service 638 for processing. The microapp service may, for example, periodically pull active data from the systems of record 628.

In some embodiments, the active data cache service 636 may be single-tenant and may store all configuration information and microapp data. It may, for example, utilize a per-tenant database encryption key and per-tenant database credentials.

In some embodiments, the credential wallet service 634 may store encrypted service credentials for the systems of record 628 and user OAuth2 tokens.

In some embodiments, the data integration provider service 632 may interact with the systems of record 628 to decrypt end-user credentials and write back actions to the systems of record 628 under the identity of the end-user. The write-back actions may, for example, utilize a user's actual account to ensure all actions performed are compliant with data policies of the application or other resource being interacted with.

In some embodiments, the analytics service 638 may process the raw events received from the microapps service 630 to create targeted scored notifications and send such notifications to the notification service 640.

Finally, in some embodiments, the notification service 640 may process any notifications it receives from the analytics service 638. In some implementations, the notification service 640 may store the notifications in a database to be later served in a notification feed. In other embodiments, the notification service 640 may additionally or alternatively send the notifications out immediately to the client 202 as a push notification to the user 626.

In some embodiments, a process for synchronizing with the systems of record 628 and generating notifications may operate as follows. The microapp service 630 may retrieve encrypted service account credentials for the systems of record 628 from the credential wallet service 634 and request a sync with the data integration provider service 632. The data integration provider service 632 may then decrypt the service account credentials and use those credentials to retrieve data from the systems of record 628. The data integration provider service 632 may then stream the retrieved data to the microapp service 630. The microapp service 630 may store the received systems of record data in the active data cache service 636 and also send raw events to the analytics service 638. The analytics service 638 may create targeted scored notifications and send such notifications to the notification service 640. The notification service 640 may store the notifications in a database to be later served in a notification feed and/or may send the notifications out immediately to the client 202 as a push notification to the user 626.

In some embodiments, a process for processing a user-initiated action via a microapp may operate as follows. The client 202 may receive data from the microapp service 630 (via the client interface service 616) to render information corresponding to the microapp. The microapp service 630 may receive data from the active data cache service 636 to support that rendering. The user 626 may invoke an action from the microapp, causing the resource access application 624 to send that action to the microapp service 630 (via the client interface service 616). The microapp service 630 may then retrieve from the credential wallet service 634 an encrypted Oath2 token for the system of record for which the action is to be invoked, and may send the action to the data integration provider service 632 together with the encrypted Oath2 token. The data integration provider service 632 may then decrypt the Oath2 token and write the action to the appropriate system of record under the identity of the user 626. The data integration provider service 632 may then read back changed data from the written-to system of record and send that changed data to the microapp service 630. The microapp service 632 may then update the active data cache service 636 with the updated data and cause a message to be sent to the resource access application 624 (via the client interface service 616) notifying the user 626 that the action was successfully completed.

In some embodiments, in addition to or in lieu of the functionality described above, the resource management services 602 may provide users the ability to search for relevant information across all files and applications. A simple keyword search may, for example, be used to find application resources, SaaS applications, desktops, files, etc. This functionality may enhance user productivity and efficiency as application and data sprawl is prevalent across all organizations.

In other embodiments, in addition to or in lieu of the functionality described above, the resource management services 602 may enable virtual assistance functionality that allows users to remain productive and take quick actions. Users may, for example, interact with the "Virtual Assistant" and ask questions such as "What is Bob Smith's phone number?" or "What absences are pending my approval?" The resource management services 602 may, for example, parse these requests and respond because they are integrated with multiple systems on the back-end. In some embodiments, users may be able to interact with the virtual assistance through either the resource access application 624 or directly from another resource, such as Microsoft Teams. This feature may allow employees to work efficiently, stay organized, and deliver only the specific information they're looking for.

Figure 7:
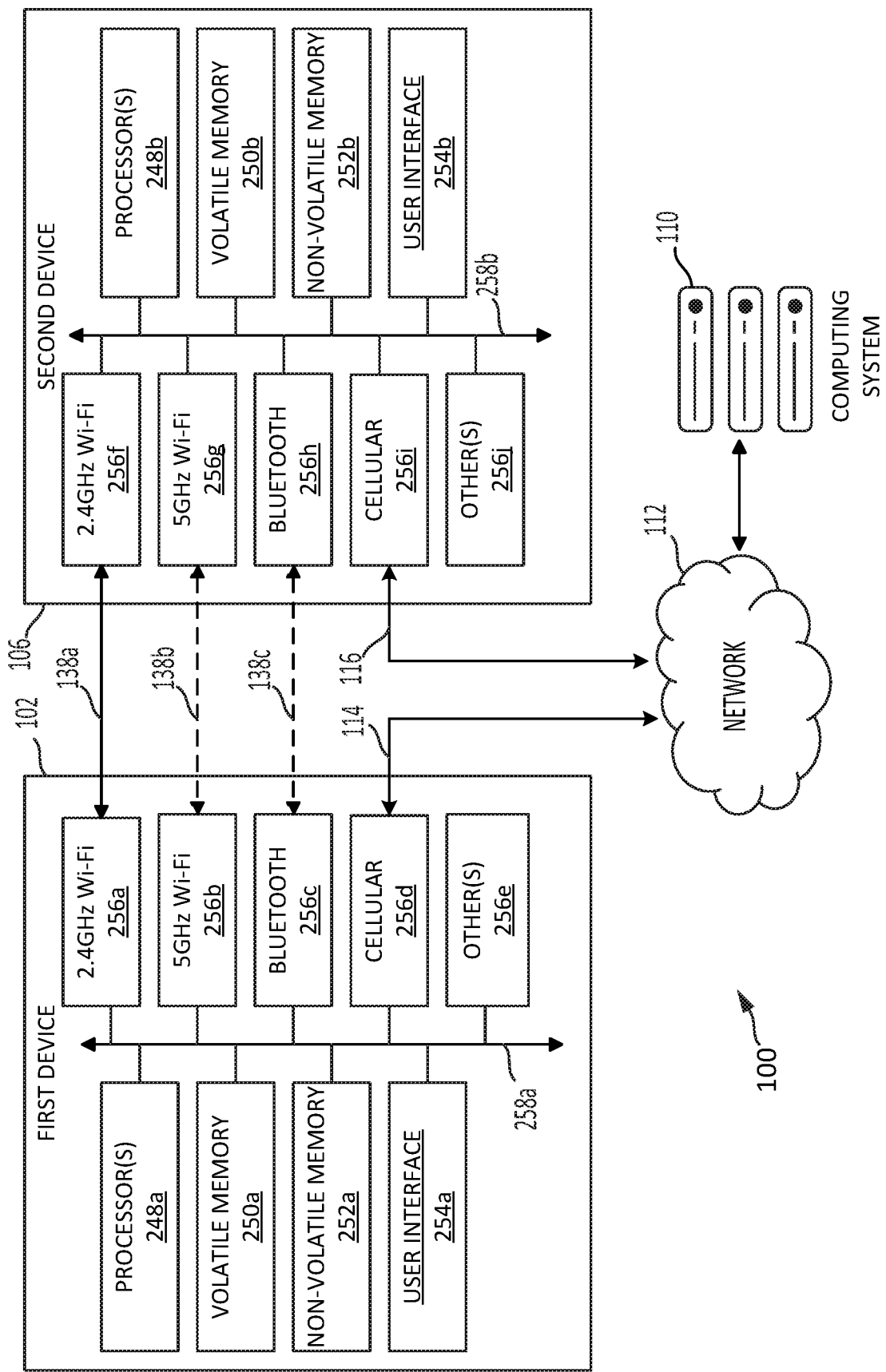
FIG. 7 is a diagram similar to FIG. 1 but showing additional details of example embodiments of the first and second devices.

G. Detailed Description of Example Embodiments of System for Sharing Bandwidth Amongst Peers FIG. 7 shows an example implementation of the system for sharing bandwidth amongst trusted peers introduced above in connection with FIG. 1. As shown, in the illustrated system, the first device 102 and the second device 106 may each be a computing system configured like the computing system 246 shown in FIG. 2D. The first device 102 and the second device 106 may, for example, each correspond to any one the clients 202 described above, and the computing system 110 may correspond to the server(s) 204 (shown in FIGS. 2A-2C and 5B) or services 602, 616, 608, 610 (shown in FIGS. 6A-C) that provide the described functionality for those clients 202. In some embodiments, for example, the computing system 110 may include the server 204a described above in connection with FIG. 2B, and the first device 102 and the second device 106 may each correspond to one of the clients 202a. In such an implementation, the network 112 shown in FIG. 7 may correspond to the network 206a shown in FIG. 2B and the first and second devices 102, 106 may each be connected to the network 112, 206a via a respective connection. The network 112, 206a may, for example, include the Internet. When so implemented, an application delivery system 214 (shown in FIG. 2B) included in the computing system 110 may be used to deliver a computing environment, application, and/or data files to one or both of the first device 102 and the second device 106.

In other embodiments, the computing system 110 may additionally or alternatively include the resource management service(s) 602, the gateway service(s) 608 and/or the SaaS applications(s) 610 described above in connection with FIGS. 6A-C, and the first device 102 and the second device 106 may each correspond to one of the clients 202. In such an implementation, the resource management service(s) 602 (shown in FIGS. 6A-C) may manage and streamline access by one or more clients 202 to one or more resource feeds 606 (via one or more gateway services 608) and/or one or more software-as-a-service (SaaS) applications 610.

In some embodiments, each of the first and second devices 102, 106 may access resources provided by the computing system 110 using a single sign-on process. That is, upon authenticating his or her identity a single time, each of the first user 104 and the second user 108 may be provided access to a wide variety of resources within a virtual workspace. An example of such a single-sign on process is described above in connection with FIGS. 6A-C. The Citrix Workspace™ and Citrix Virtual Apps and Desktops™, by Citrix Systems, Inc., of Fort Lauderdale, Fla., are some examples of computing systems capable of providing such an environment. In some embodiments, two or more devices that have been properly logged on to virtual workspaces associated with the same organization may have a trust relationship sufficient to allow the seamless and secure bandwidth sharing techniques described herein to be employed.

In other embodiments, the computing system 110 may include the file sharing system 230 described above in connection with FIG. 2C, and the first device 102 and the second device 106 may each correspond to one of the authorized clients 202b. In such an implementation, the network 112 shown in FIG. 7 may correspond to the network 206c shown in FIG. 2C and the first and second devices 102, 106 may each be connected to the network 112, 206c via a respective connection. The network 112, 206c may, for example, include the Internet. When so implemented, the file sharing system 230 included in the computing system 110 may enable the transfer of files between the first and second devices 102, 106 and one or more storage media 240 (shown in FIG. 2C). In some such implementations, users of the first and second devices 102, 106 may need to authenticate their identities to the access management system 234 before they can use the first and second devices 102, 106 to authorize the uploading and/or downloading of files from the storage medium(s) 240. In some embodiments, two or more devices that have been properly logged on to the same file sharing system for a particular enterprise may have a trust relationship sufficient to allow the seamless and secure bandwidth sharing techniques described herein to be employed. In some embodiments, users may need to log in to the access management system 234 (shown in FIG. 2C) when access to the file sharing system 230 is desired. In other embodiments, devices may be automatically logged into such a file sharing system whenever users authenticate their identities to an enterprise server to access the enterprise's network resources. In other embodiments, such a file sharing system may be one of the many resources that is accessible via a virtual computing environment such as that provided by an application delivery system 214, such as that described above in connection with FIG. 2B.

In yet other embodiments, the computing system 110 may be any other system to which the users of the first and second devices 102, 106 can authenticate their identities to establish a trust relationship sufficient to allow the seamless and secure bandwidth sharing techniques described herein to be employed. In still other embodiments, an adequate trust relationship may be established independent of the operation of the computing system 110. For example, in some implementations, members of a peer group may simply share with one another a common password or token that may suffice to establish a trust relationship adequate to allow the seamless and secure bandwidth sharing techniques described herein to be employed.

As shown in FIG. 7, the first and second devices 102, 106 may each include numerous communications interfaces 256a-j. Although, in the example shown, all of the communications interfaces 256 are wireless, non-wireless interfaces may additionally or alternatively employed in some embodiments, e.g., as the "other" communications interfaces 256e, 256j. In the illustrated example, a first cellular transceiver 256d is used to establish the first connection 114 with the network 112 and a second cellular transceiver 256i is used to establish the second connection 116 with the network 112. The first and second connections 114, 116 may represent different cellular connections with different network service providers or may represent different cellular connections with the same network service provider. In some embodiments, for example, the network 112 may include the Internet and the connections 114, 116 may be with one or more Internet service providers, such as AT&T, Verizon, Sprint, etc.

As shown, at least one peer-to-peer connection 138 may additionally be selectively established between common communications interfaces of the first and second devices 102, 106. In the illustrated example, a first peer-to-peer connection 138a is established between a first 2.4 GHz Wi-Fi transceiver 256a of the first device 102 and a second 2.4 GHz Wi-Fi transceiver 256f of the second device 106. In addition, as shown, a second peer-to-peer connection 138b may additionally or alternatively be established between a first 5 GHz Wi-Fi transceiver 256b of the first device 102 and a second 5 GHz Wi-Fi transceiver 256g of the second device 106, and/or a third peer-to-peer connection 138c may be established between a first Bluetooth transceiver 256c of the first device 102 and a second Bluetooth transceiver 256h of the second device 106. Although not illustrated, it should be appreciated that, in some embodiments, one or both of the first and second connections 114, 116 with the network 112 may alternatively be established using one or more of the Wi-Fi and/or Bluetooth transceivers 256a-c, 256f-h, and/or other communications interface 256e, 256j (e.g., an Ethernet interface) rather than the cellular transceivers 256d, 256i, with peer-to-peer connection(s) 138 being established between one or more pairs of the remaining communications interfaces 256. For example, in some implementations, the second device 106 may correspond to a "hub" or similar device that is connected to the network 112 (e.g., via Wi-Fi or Ethernet) and with which the computing system 110 has a trust relationship. In such implementations, such a hub device may thus enable seamless and secure tethering of the first device 102 to the network 112 via a peer-to-peer connection 138 with another communications interface 256 of the hub device.

Figure 8:
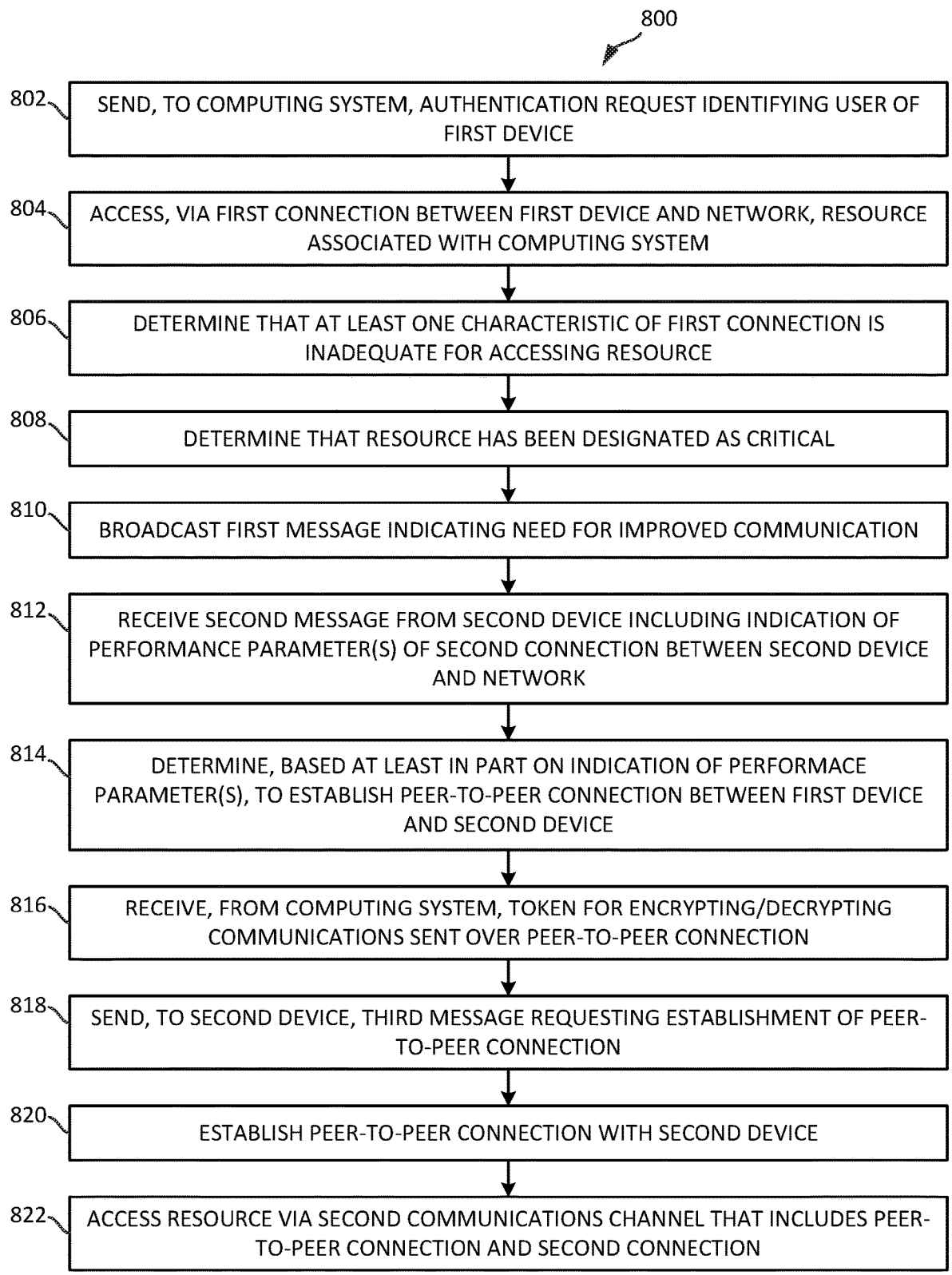
FIG. 8 is a flow chart illustrating an example routine that may be executed by the first device shown in FIG. 7.
Figure 9:
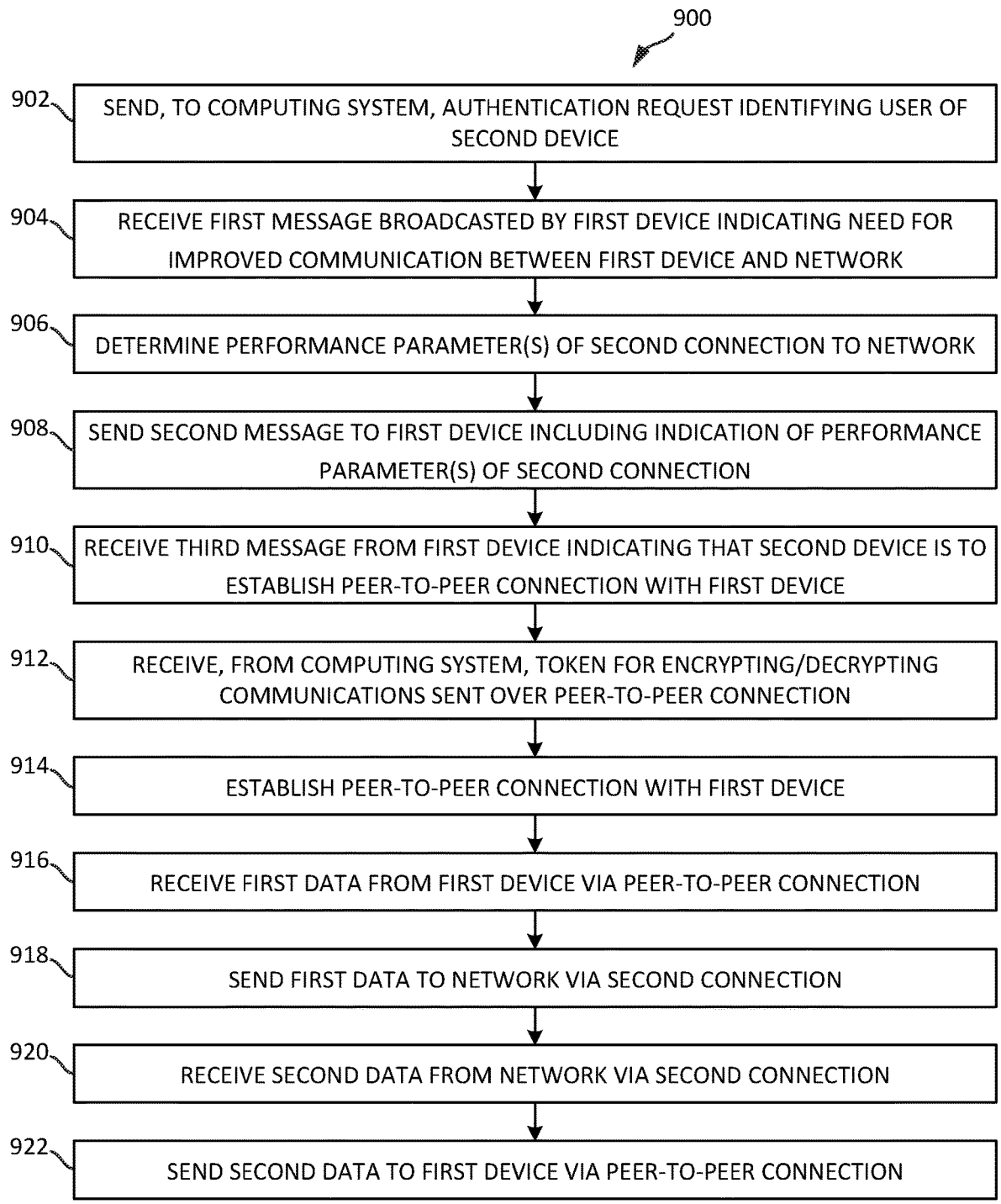
FIG. 9 is a flow chart illustrating an example routine that may be executed by the second device shown in FIG. 7.

FIG. 8 is a flowchart illustrating an example of a routine 800 that may be executed by the first device 102 shown in FIG. 7. For example, in some embodiments, the volatile memory 250a and/or non-volatile memory 252a of the first device 102 may be encoded with instructions which, when executed by the processor(s) 248a of the first device 102, cause the first device 102 to perform the routine 800. FIG. 9 is a flowchart illustrating an example of a routine 900 that may be executed by the second device 106 shown in FIG. 7. For example, in some embodiments, the volatile memory 250b and/or non-volatile memory 252b of the second device 106 may be encoded with instructions which, when executed by the processor(s) 248b of the second device 106, cause the second device 106 to perform the routine 900. In some embodiments, the first and second devices 102, 106 may each be provisioned with a special application (e.g., a "reliable network app") that enables it, either alone or together with services provided by the computing system 110, to perform some or all of the steps of the routine 800 and/or the routine 900. As explained below, several of the steps of each of the routines 800 and 900 involve the exchange of messages between the first and second device 102, 106.

As shown in FIG. 8, at a step 802 of the routine 800, the first device 102 may send an authentication request to the computing system 110. Similarly, at a step 902 of the routine 900, the second device 106 may also send an authentication request to the computing system 110. Such authentication requests may, for example, identify the respective users of the devices and include authentication credentials, e.g., passwords, to authenticate the users' identities. In some embodiments, one or more additional authentication steps involving separate communications channel(s) may additionally be employed to achieve multi-factor authentication. In some embodiments, the authentication requests referenced at the steps 802, 902 may correspond to the users logging into a virtual workspace environment, a file sharing system, an enterprise server, or some other system capable of authenticating the user's identities.

At a step 804 of the routine 800, the first device 102 may access a resource on the computing system 110, e.g., an application, a computing environment, a file, etc., via the first connection 114 between the first device 102 and the network 112.

At a step 806, the first device 102 may determine that at least one characteristic of the first connection 114 is inadequate to access the resource, e.g., to deliver an application from the computing system 110. For example, in some embodiments, the first device 102 may evaluate data exchanges with the computing system 110 (periodically or otherwise) to assess one or more performance parameters of its connection to the network 112, such as available bandwidth, round trip latency, packet loss percentage, packet jitter, page response time, etc. In some embodiments, available bandwidth may be determined by periodically measuring the amount of data (in bits) sent every second for both upload and download. An average upload speed and an average download speed may then be determined by calculating averages of such periodically measured amounts.

In systems that implement packet flow control, e.g., transmission control protocol (TCP) based applications or user-datagram protocol (UDP) based applications like QUIC, EDT, for each packet that is sent from a transmitting device to a recipient device, the recipient device will return an acknowledgement ("ACK") message to the transmitting device. In such systems, a round trip latency value may be determined, for example, by calculating a difference between a time when a packet is sent and a time that an ACK message is received from the recipient device. In addition, in such systems, packets for which an ACK message is not received may be deemed to have been lost. A packet loss percentage may thus be calculated, in some embodiments, as a ratio of total number of packets lost to the total number of packets sent.

Packet jitter, sometimes referred to as packet delay variation (PDV), is the variation in latency as measured in the variability over time of the end-to-end delay across a network. A network with constant delay has no packet jitter. In some embodiments, packet jitter may be determined by measuring time differences between packet inter-arrival times. Packet jitter may, for example, be expressed as an average of the deviation from the network mean delay. High packet jitter values may, for example, have an adverse impact on real-time traffic such as voice over internet protocol (VoIP). A page response time is the amount of time taken for a web request to be completely responded by the server. A page response time may thus be determined, for example, by measuring a time difference between when a request is initiated and when a response is completely received.

In other embodiments, a service, such as the Connection Quality Indicator, offered by Citrix Systems, Inc., of Fort Lauderdale, Fla., may be used to assess one or more performance parameters of the first connection 114.

The first device 102 may, for example, determine that an available bandwidth of the first connection 114 is below a threshold value (e.g., one megabits per second (Mbps)), that a round trip latency over the first connection is above a threshold value (e.g., two-hundred milliseconds), that a packet loss percentage via the first connection 114 is above a threshold value (e.g., one percent), that packet jitter is above a threshold value (e.g., thirty milliseconds), and/or that page response time is above a threshold value (e.g., five-hundred milliseconds). In some embodiments, one or more such threshold values may set by the system administrator 140 (shown in FIG. 1). Further, in some embodiments, different threshold values may be set for different applications that the system administrator 140 has designated as critical.

At a step 808, the first device 102 may determine that at least one application (or other resource) being accessed via the first connection has been designated as critical, i.e., of sufficient importance to warrant use of the bandwidth sharing techniques described herein. For example, in some embodiments, the network administrator 140 (shown in FIG. 1) may designated certain applications (or other resources) as critical, and the routine 800 may use excess bandwidth from other devices to support the accessing of only those applications (or other resources) that have been so designated. For example, an administrator of a business enterprise may designate only work-related applications as critical, so that accessing of social media or other non-work related applications will not trigger the sharing of excess bandwidth as described herein. In other embodiments, the routines 800, 900 may cause excess bandwidth to be seamlessly and securely shared without regard to whether or how resources are designated.

At a step 810, the first device 102 may broadcast a first message, e.g., using a communications interface 256 other than that used to establish the first connection 114 (e.g., the 2.4 GHz Wi-Fi transceiver 256a), indicating the first device's need for improved communication (e.g., additional bandwidth) with the network 112. After broadcasting the first message, the first device 102 may await responses from any other devices (e.g., the second device 106) that happen to be in communication range of the broadcasting communications interface 256.

As shown in FIG. 9, at a step 904 of the routine 900, the second device 106 may receive the first message (e.g., via the 2.4 GHz Wi-Fi transceiver 256f) broadcasted by the first device 102. Other devices (not shown in FIG. 7) may additionally receive the same first message.

Each device that does receive the first message may then take steps to determine one or more performance parameters (e.g., available bandwidth, round trip latency, packet loss percentage, packet jitter, page response time, etc.) of another connection it has with the network 112 and send a second message indicating such information to the first device 102. For example, in some embodiments, using one or more of the techniques described above, each such recipient device may exchange data with the computing system 110 (periodically, in response to receiving the first message, or otherwise) to assess one or more performance parameters of its connection to the network 112. In other embodiments, a service, such as the Connection Quality Indicator, offered by Citrix Systems, Inc., of Fort Lauderdale, Fla., may be used to assess one or more performance parameters of such connections.

As shown in FIG. 9, at a step 904, the second device 106 may receive the first message that was broadcasted by the first device 102. At a step 906, the second device 106 may determine the one or more performance parameters of the second connection 116. And, at a step 908, the second device 106 may send a second message to the first device 102 (e.g., using the same communication interface 256 that received the first message) that includes an indication of the available bandwidth and/or one or more other determined performance parameter of the second connection 116. After sending the second message, the second device 106 may await a response, if any, indicating that the second device 106 is to establish a peer-to-peer connection 138 with the first device 102 for use in tethering the first device 102 to the network 112. Each of the other devices that also sent a similar second message to the first device 102 may also similarly await a response from the first device 102. As shown in FIG. 8, the second device 106 may, at a step 910, receive from the first device 102 a third message indicating that the second device 106 has been selected to establish a peer-to-peer connection 138.

Returning to FIG. 8, at a step 812, the first device 102 may receive the second message (sent by the second device 106 at the step 908) from the second device 106. Although not illustrated, the first device 102 may also receive similar second messages from other devices that similarly received and responded to the broadcasted first message. Each such second message the first device 102 receives may indicate the available bandwidth and/or other performance parameters of a respective device's connection to the network 112.

At a step 814, the first device 102, based at least in part on the available bandwidth and/or other performance parameters indicated in the received second message(s), may select one of the responding devices to establish a peer-to-peer connection 138 via the communications interfaces 256 over which the first and second messages were exchanged. In the illustrated example, the first device 102 selects the second device 106 for that purpose. For example, based on the received second message(s), the first device 102 may determine to establish the peer-to-peer connection 138a between the 2.4 GHz Wi-Fi transceivers 256a, 256f shown in FIG. 7. The determination of the device with which to establish a peer-to-peer connection 138 may depend on a number of factors and the determination may be made in a number of ways. In some embodiments, an algorithm may be performed to evaluate the various connection options and select the one that will provide the best possible supplemental connection with the network 112 for the purpose of accessing the desired resource(s) on the computing system 110, and preferably without causing other devices to suffer a starvation of needed bandwidth. Examples of criteria that may be taken into account when selecting the optimal device with which to establish a peer-to-peer connection 138 are described above in connection with step 124 shown in FIG. 1.

In some embodiments, the first device may additionally or alternatively determine signal strengths of the signals being emitted by the various responding communications interfaces 256, and additionally or alternatively may take that information into account when selecting the optimal device with which to establish a peer-to-peer connection 138. In addition, in some embodiments, a determination may be made as to whether some or all of the performance characteristics indicated in the received second message(s) meet certain thresholds in order for those connections to be considered for use in improving communications between the first device 102 and the network 112.

In some embodiments, various devices may be associated with different priority statuses corresponding to a determined hierarchy of user statuses or job functions within an organization. In such embodiments, care may be taken to ensure that high priority users are supplied with adequate bandwidth in as many circumstances as possible, and that the ability of lower-priority users to obtain excess bandwidth from other, higher-priority users is limited, at least in some circumstances.

At a step 816 of the routine 800, the first device may receive a token from the computing system 110 that can be used to encrypt and descript communications over the peer-to-peer connection 138 with the second device 106. In some embodiments, the token may be received from the computing system 110 based on the authentication performed at the step 802, either at the time the authentication was performed or subsequently, e.g., after the determination to establish the peer-to-peer connection 138 has been made. In some embodiments, for example, the token may be used to perform a particular type of Wi-Fi Protected Access (WPA) encryption of communications between the communications interfaces 256 of the respective devices.

As a step 818, the first device 102 may send a third message to the second device 106 that requests that a peer-to-peer connection 138 be established between wireless interfaces 256 of the two devices, e.g., the 2.4 GHz Wi-Fi transceivers 256a, 256f shown in FIG. 7.

Referring again to FIG. 9, at a step 910 of the routine 900, the second device 106 may receive the third message from the first device 102 and, at a step 912, may also receive the token from the computing system 110. As with the first device 102, in some embodiments, the second device 106 may receive the token from the computing system 110 based on the authentication performed at the step 902, either at the time the authentication was performed or subsequently, e.g., after the third message has been received at the step 910.

Next, at a step 820 of the routine 800 (FIG. 8) and a step 914 of the routine 900 (FIG. 9), the first and second devices 102, 106 may cooperate to establish a peer-to-peer connection 138 between the two communications interfaces 256 that have been exchanging messages. For example, the peer-to-peer connection 138a may be established between the 2.4 GHz Wi-Fi transceiver 256a of the first device 102 and the 2.4 GHz Wi-Fi transceiver 256f of the second device 106.

As shown in FIG. 8, after a peer-to-peer connection 138 has been established, at a step 822, the first device 102 may access one or more applications (or other resources) of the computing system 110 via a communications channel that includes the established peer-to-peer connection 138 and the second connection 116. The step 822 may, for example, be enabled by steps 916, 918, 920, and 922 of the routine 900 performed by the second device 106. In particular, as shown in FIG. 9, the second device 106 may receive first data from the first device 102 via the established peer-to-peer connection 138 (step 916) and forward the received first data to the network 112 via the second connection 116 (step 918). Similarly, the second device 106 may receive second data from the network 112 via the second connection 116 (step 920) and forward the received second data to the first device 102 via the established peer-to-peer connection 138 (step 922).

It should be appreciated that, in some embodiments, each of the communications interfaces 256a-d other than the one used to establish the first connection 114 may be used to establish a separate peer-to peer connection 138 with a corresponding communications interface 256 of another device. Each such peer-to-peer connection 138 so established may then be used, together with a connection between the device including the corresponding communications interface 256 and the network, to form a respective communications channel between the first device 102 and the network 112. When multiple communications channels are established, channel bonding techniques may be used to allow the first device to access a resource on the computing system 110 via the combined bandwidth of the various channels.

For example, with reference to FIG. 7, a process similar to that described in connection with FIGS. 8 and 9 may be used to establish three separate peer-to-peer connections 138*a*, 138*b*, and 138*c* between the first device 102 and the second device 106, and the bandwidth of those three peer-to-peer connections may be combined to maximize the throughput between the first device 102 and the second device 106. For example, in some embodiments, the first device 102 and the second device 106 may each include software-defined networking in a wide area network (SD-WAN) logic that allows data traffic for a single logical communication channel between the first device 102 and the second device 106 to be distributed amongst multiple separate physical links, e.g., the peer-to-peer connections 138*a*, 138*b*, and 138*c*.

In other embodiments, one or both of the peer-to-peer connections 138*b* and 138*c* may be established with a third device (not shown) which also has another connection with the network 112. In such an implementation, the bandwidth of a first communications channel (including the peer-to-peer connection 138*a* and the second connection 116 shown in FIG. 7) and a second communications channel (e.g., including a peer-to-peer connection between the 5 GHz Wi-Fi transceiver 256*b* shown in FIG. 7 and a corresponding 5 GHz Wi-Fi transceiver of a third device) may be combined to provide the first device 102 additional bandwidth to access a resource on the computing system 110 via the network 112. For example, in some embodiments, the first device 102 and the computing system 110 may each include SD-WAN logic that allows data traffic for a single logical communication channel between the first device and the computing system 110 to be distributed amongst multiple separate physical links, e.g., the first communications channel (including the peer-to-peer connection 138*a* and the second connection 116 shown in FIG. 7) and the second communications channel (e.g., including the peer-to-peer connection between the 5 GHz Wi-Fi transceiver 256*b* shown in FIG. 7 and the corresponding 5 GHz Wi-Fi transceiver of the third device).

Further, it should be appreciated that, in some embodiments, rather than replacing the first connection 114 with one or more alternate communications channels that include peer-to-peer connections 138, one or more such communication channels (that include one or more peer-to-peer connections 138 with one or more other devices) may supplement the bandwidth provided by the first connection 114. For example, with reference to FIG. 7, the bandwidth of the first connection 114 may be combined with the bandwidth of one or more additional communications channels, e.g., a communications channel including the peer-to-peer connection 138*a* and the second connection 116. In some embodiments, for example, the first device 102 and the computing system 110 may each include SD-WAN logic that allows data traffic for a single logical communication channel between the first device 102 and the computing system 110 to be distributed amongst multiple separate physical links, e.g., the first connection 114 and the communications channel including the peer-to-peer connection 138*a* and the second connection 116 (and possibly other communications channels as well).

H. Example Implementations of Methods, Systems, and Computer-Readable Media in Accordance with the Present Disclosure The following paragraphs (M1) through (M25) describe examples of methods that may be implemented in accordance with the present disclosure.

(M1) A first device connected to a network via a first connection may perform a method that involves determining a need for improved communication between the first device and the network, receiving a message from a second device that includes an indication of at least one performance parameter of a second connection between the second device and the network, establishing a peer-to-peer connection between the first device and the second device based at least in part on the indication, and communicating with the network via a communications channel that includes the peer-to-peer connection and the second connection.

(M2) A method may be performed as described in paragraph (M1), wherein the peer-to-peer connection may be established between a first wireless interface of the first device and a second wireless interface of the second device.

(M3) A method may be performed as described in paragraph (M1) or paragraph (M2), wherein the determining the need for improved communication may further involve determining that at least one performance parameter of the first connection is inadequate for at least one application executing under control of the first device.

(M4) A method may be performed as described in paragraph (M3), wherein the at least one performance parameter of the first connection may include an available bandwidth of the first connection, and the determining that the at least one performance parameter of the first connection is inadequate may further involve determining the available bandwidth of the first connection, and determining that the available bandwidth of the first connection is below a threshold.

(M5) A method may be performed as described in paragraph (M3) or paragraph (M4), wherein the at least one performance parameter of the first connection may include a latency of communications over the first connection, and the determining that the at least one performance parameter of the first connection is inadequate may further involve determining the latency of communications over the first connection, and determining that the latency of communications over the first connection exceeds a threshold.

(M6) A method may be performed as described in any of paragraphs (M3) through (M5), wherein the at least one performance parameter of the first connection may include a loss of data sent via the first connection, and the determining that the at least one performance parameter of the first connection is inadequate may further involve determining the loss of data sent via the first connection, and determining that the loss of data sent via the first connection exceeds a threshold.

(M7) A method may be performed as described in any of paragraphs (M3) through (M6), wherein the determining that at least one performance parameter of the first connection is inadequate further involves determining that the at least one application has been designated as critical.

(M8) A method may be performed as described in any of paragraphs (M1) through (M7), and may further comprise determining, based at least in part on the indication, to establish the peer-to-peer connection with the second device, and sending, to the second device, a message requesting establishment of the peer-to-peer connection.

(M9) A method may be performed as described in any of paragraphs (M1) through (M8), and may further comprise broadcasting, by the first device, a message indicating the need for improved communication.

(M10) A method may be performed as described in paragraph (M8) or paragraph (M9), wherein the at least one performance parameter of the second connection may include an available bandwidth of the second connection, and the determining to establish the peer-to-peer connection may further involve determining that the available bandwidth of the second connection is above a threshold.

(M11) A method may be performed as described in any of paragraphs (M8) through (M10), wherein the at least one performance parameter of the second connection may include an available bandwidth of the second connection, and the determining to establish the peer-to-peer connection may further involve receiving, by the first device, a second message from a third device, the second message including an indication of available bandwidth of a third connection between the third device and the network, and determining that the available bandwidth of the second connection is greater than the available bandwidth of the third connection.

(M12) A method may be performed as described in any of paragraphs (M8) through (M11), wherein the determining to establish the peer-to-peer connection may further involve determining a strength of a first signal emitted by a wireless interface of the second device.

(M13) A method may be performed as described in paragraph (M12), wherein the determining to establish the peer-to-peer connection may further involve determining that the strength of the first signal is above a threshold.

(M14) A method may be performed as described in paragraph (M12) or paragraph (M13), wherein the determining to establish the peer-to-peer connection may further involve determining a strength of a second signal emitted by a wireless interface of a third device, and determining that the strength of the first signal is greater than the strength of the second signal.

(M15) A method may be performed as described in any of paragraphs (M1) through (M14), and may further involve sending, to a computing system, an authentication request identifying a user of the first device, receiving, from the computing system and based at least in part on the authentication request, a token, and encrypting communications sent over the peer-to-peer connection based at least in part on the token.

(M16) A method may be performed as described in any of paragraphs (M1) through (M15), and may further involve sending, to a computing system, an authentication request identifying a user of the first device, and receiving, from the computing system and based at least in part on the authentication request, data enabling the first device to cause the second device to establish the communications channel.

(M17) A method may be performed as described in any of paragraphs (M1) through (M16), and may further involve establishing, based at least in part on the indication, another peer-to-peer connection between the first device and the second device, and communicating, by the first device, with the network via a combination of the first communications channel and a second communications channel that includes the other peer-to-peer connection and the second connection.

(M18) A method may be performed as described in any of paragraphs (M1) through (M17), and may further involve receiving, by the first device, a second message from a third device, the second message including a second indication of at least one performance parameter of a third connection between the third device and the network, establishing, based at least in part on the second indication, another peer-to-peer connection between the first device and the third device, and communicating with the network via a combination of the first communications channel and a second communications channel that includes the other peer-to-peer connection and the third connection.

(M19) A second device may perform a method, in conjunction with a first device connected to a network via a first connection, that involves receiving a first message broadcasted by the first device that indicates a need for improved communication between the first device and the network, determining at least one performance parameter of a second connection between the second device and the network, sending a second message to the first device including an indication of the at least one performance parameter of the second connection, and establishing a peer-to-peer connection with the first device. Once the peer-to-peer connection has been established, first data may be received from the first device via the peer-to-peer connection and sent to the network via the second connection, and second data may be received from the network via the second connection and sent to the first device via the peer-to-peer connection.

(M20) A method may be performed as described in paragraph (M19), and may further involve receiving, by the second device, a third message from the first device, the third message indicating that the peer-to-peer connection is to be established.

(M21) A method may be performed as described in paragraph (M19) or paragraph (M20), and may further involve sending, to a computing system, an authentication request identifying a user of the second device, receiving, from the computing system and based at least in part on the authentication request, a token, encrypting communications sent over the peer-to-peer connection based at least in part on the token, and decrypting communications received via the peer-to-peer connection based at least in part on the token.

(M22) A method may be performed as described in any of paragraphs (M19) through (M21), and may further involve establishing, by the second device and while the peer-to-peer connection is established, another peer-to-peer connection with the first device, receiving, by the second device, third data from the first device via the other peer-to-peer connection, sending, by the second device, the third data to the network via the first connection, receiving, by the second device, fourth data from the network via the first connection, and sending, by the second device, the fourth data to the first device via the other peer-to-peer connection.

(M23) A method may be performed as described in any of paragraphs (M19) through (M22), wherein the at least one performance parameter of the second connection includes available bandwidth of the second connection.

(M24) A method may be performed as described in any of paragraphs (M19) through (M23), wherein the at least one performance parameter of the second connection includes data loss over the second connection.

(M25) A method may be performed as described in any of paragraphs (M19) through (M24), wherein the at least one performance parameter of the second connection includes latency of communications over the second connection.

The following paragraphs (S1) through (S25) describe examples of systems that may be implemented in accordance with the present disclosure.

(S1) A first computing system may comprise at least one processor and at least one computer-readable medium encoded with instruction which, when executed by the at least one processor, cause the first computing system to determine a need for improved communication between the first computing system and a network when the first computing system is connected to the network via a first connection, to receive a message from a second computing system, the message including an indication of at least one performance parameter of a second connection between the second computing system and the network, to establish, based at least in part on the indication, a peer-to-peer connection between the first computing system and the second computing system, and to communicate with the network via a communications channel that includes the peer-to-peer connection and the second connection.

(S2) A first computing system may be configured as described in paragraph (S1), wherein the at least one computer-readable medium may be encoded with instruction which, when executed by the at least one processor, further cause the first computing system to establish the peer-to-peer connection between a first wireless interface of the first computing system and a second wireless interface of the second computing system.

(S3) A first computing system may be configured as described in paragraph (S1) or paragraph (S2), wherein the at least one computer-readable medium may be encoded with instruction which, when executed by the at least one processor, further cause the first computing system to determine the need for improved communication at least by determining that at least one performance parameter of the first connection is inadequate for at least one application executing under control of the first computing system.

(S4) A first computing system may be configured as described in paragraph (S3), wherein the at least one performance parameter of the first connection may include an available bandwidth of the first connection, and the at least one computer-readable medium may be encoded with instruction which, when executed by the at least one processor, further cause the first computing system to determine that the at least one performance parameter of the first connection is inadequate at least by determining the available bandwidth of the first connection, and to determine that the available bandwidth of the first connection is below a threshold.

(S5) A first computing system may be configured as described in paragraph (S3) or paragraph (S4), wherein the at least one performance parameter of the first connection may include a latency of communications over the first connection, and the at least one computer-readable medium may be encoded with instruction which, when executed by the at least one processor, further cause the first computing system to determine that the at least one performance parameter of the first connection is inadequate at least by determining the latency of communications over the first connection, and determining that the latency of communications over the first connection exceeds a threshold.

(S6) A first computing system may be configured as described in any of paragraphs (S3) through (S5), wherein the at least one performance parameter of the first connection may include a loss of data sent via the first connection, and the at least one computer-readable medium may be encoded with instruction which, when executed by the at least one processor, further cause the first computing system to determine that the at least one performance parameter of the first connection is inadequate at least by determining the loss of data sent via the first connection, and determining that the loss of data sent via the first connection exceeds a threshold.

(S7) A first computing system may be configured as described in any of paragraphs (S3) through (S6), wherein the at least one computer-readable medium may be encoded with instruction which, when executed by the at least one processor, further cause the first computing system to determine that at least one performance parameter of the first connection is inadequate at least by determining that the at least one application has been designated as critical.

(S8) A first computing system may be configured as described in any of paragraphs (S1) through (S7), wherein the at least one computer-readable medium may be encoded with instruction which, when executed by the at least one processor, further cause the first computing system to determine, based at least in part on the indication, to establish the peer-to-peer connection with the second computing system, and to send, to the second computing system, a message requesting establishment of the peer-to-peer connection.

(S9) A first computing system may be configured as described in any of paragraphs (S1) through (S8), wherein the at least one computer-readable medium may be encoded with instruction which, when executed by the at least one processor, further cause the first computing system to broadcast a message indicating the need for improved communication.

(S10) A first computing system may be configured as described in paragraph (S8) or paragraph (S9), wherein the at least one performance of the second connection parameter may include an available bandwidth of the second connection, and the at least one computer-readable medium may be encoded with instruction which, when executed by the at least one processor, further cause the first computing system to determine to establish the peer-to-peer connection at least by determining that the available bandwidth of the second connection is above a threshold.

(S11) A first computing system may be configured as described in any of paragraphs (S8) through (S10), wherein the at least one performance parameter of the second connection may include an available bandwidth of the second connection, and the at least one computer-readable medium may be encoded with instruction which, when executed by the at least one processor, further cause the first computing system to determine to establish the peer-to-peer connection at least by receiving, by the first computing system, a second message from a third device, the second message including an indication of available bandwidth of a third connection between the third device and the network, and determining that the available bandwidth of the second connection is greater than the available bandwidth of the third connection.

(S12) A first computing system may be configured as described in any of paragraphs (S8) through (S11), wherein the at least one computer-readable medium may be encoded with instruction which, when executed by the at least one processor, further cause the first computing system to determine to establish the peer-to-peer connection at least by determining a strength of a first signal emitted by a wireless interface of the second computing system.

(S13) A first computing system may be configured as described in paragraph (S12), wherein the at least one computer-readable medium may be encoded with instruction which, when executed by the at least one processor, further cause the first computing system to determine to establish the peer-to-peer connection at least by determining that the strength of the first signal is above a threshold.

(S14) A first computing system may be configured as described in paragraph (S12) or paragraph (S13), wherein the at least one computer-readable medium may be encoded with instruction which, when executed by the at least one processor, further cause the first computing system to determine to establish the peer-to-peer connection at least by determining a strength of a second signal emitted by a wireless interface of a third device, and determining that the strength of the first signal is greater than the strength of the second signal.

(S15) A first computing system may be configured as described in any of paragraphs (S1) through (S14), wherein the at least one computer-readable medium may be encoded with instruction which, when executed by the at least one processor, further cause the first computing system to send, to a third computing system, an authentication request identifying a user of the first computing system, to receive, from the third computing system and based at least in part on the authentication request, a token, and to encrypt communications sent over the peer-to-peer connection based at least in part on the token.

(S16) A first computing system may be configured as described in any of paragraphs (S1) through (S15), wherein the at least one computer-readable medium may be encoded with instruction which, when executed by the at least one processor, further cause the first computing system to send, to a third computing system, an authentication request identifying a user of the first computing system, and to receive, from the third computing system and based at least in part on the authentication request, data enabling the first computing system to cause the second computing system to establish the communications channel.

(S17) A first computing system may be configured as described in any of paragraphs (S1) through (S16), wherein the at least one computer-readable medium may be encoded with instruction which, when executed by the at least one processor, further cause the first computing system to establish, based at least in part on the indication, another peer-to-peer connection between the first computing system and the second computing system, and to communicate with the network via a combination of the first communications channel and a second communications channel that includes the other peer-to-peer connection and the second connection.

(S18) A first computing system may be configured as described in any of paragraphs (S1) through (S17), wherein the at least one computer-readable medium may be encoded with instruction which, when executed by the at least one processor, further cause the first computing system to receive a second message from a fourth computing system, the second message including a second indication of at least one performance parameter of a third connection between the fourth computing system and the network, to establish, based at least in part on the second indication, another peer-to-peer connection between the first computing system and the fourth computing system, and to communicate with the network via a combination of the first communications channel and a second communications channel that includes the other peer-to-peer connection and the third connection.

(S19) A second computing system may comprise at least one processor and at least one computer-readable medium encoded with instruction which, when executed by the at least one processor, cause the second computing system to receive a first message broadcasted by a first computing system connected to a network via a first connection, the first message indicating a need for improved communication between the first computing system and the network, to determine at least one performance parameter of a second connection between the second computing system and the network, to send a second message to the first computing system, the second message including an indication of the at least one performance parameter of the second connection, to establish a peer-to-peer connection with the first computing system, to receive first data from the first computing system via the peer-to-peer connection, to send the first data to the network via the second connection, to receive second data from the network via the second connection, and to send the second data to the first computing system via the peer-to-peer connection.

(S20) A second computing system may be configured as described in paragraph (S19), wherein the at least one computer-readable medium may be encoded with instruction which, when executed by the at least one processor, further cause the second computing system to send a third message from the first computing system, the third message indicating that the peer-to-peer connection is to be established.

(S21) A second computing system may be configured as described in paragraph (S19) or paragraph (S20), wherein the at least one computer-readable medium may be encoded with instruction which, when executed by the at least one processor, further cause the second computing system to send to a third computing system, an authentication request identifying a user of the second computing system, to receive, from the third computing system and based at least in part on the authentication request, a token, to encrypt communications sent over the peer-to-peer connection based at least in part on the token, and to decrypt communications received via the peer-to-peer connection based at least in part on the token.

(S22) A second computing system may be configured as described in any of paragraphs (S19) through (S21), and wherein the at least one computer-readable medium may be encoded with instruction which, when executed by the at least one processor, further cause the second computing system to establish, while the peer-to-peer connection is established, another peer-to-peer connection with the first computing system, to receive third data from the first computing system via the other peer-to-peer connection, to send the third data to the network via the first connection, to receive fourth data from the network via the first connection, and to send the fourth data to the first computing system via the other peer-to-peer connection.

(S23) A second computing system may be configured as described in any of paragraphs (S19) through (S22), wherein the at least one performance parameter of the second connection includes available bandwidth of the second connection.

(S24) A second computing system may be configured as described in any of paragraphs (S19) through (S23), wherein the at least one performance parameter of the second connection includes data loss over the second connection.

(S25) A second computing system may be configured as described in any of paragraphs (S19) through (S24), wherein the at least one performance parameter of the second connection includes latency of communications over the second connection.

The following paragraphs (CRM1) through (CRM25) describe examples of computer-readable media that may be implemented in accordance with the present disclosure.

(CRM1) At least one non-transitory, computer-readable medium may be encoded with instructions which, when executed by at least one processor included in a first computing system, cause the at least one processor to determine a need for improved communication between the first computing system and a network when the first computing system is connected to the network via a first connection, to receive a message from a second computing system, the message including an indication of at least one performance parameter of a second connection between the second computing system and the network, to establish, based at least in part on the indication, a peer-to-peer connection between the first computing system and the second computing system, and to communicate with the network via a communications channel that includes the peer-to-peer connection and the second connection.

(CRM2) At least one non-transitory, computer-readable medium may be encoded with instructions as described in paragraph (CRM1), and may be further encoded with additional instructions which, when executed by the at least one processor, further cause the at least one processor to establish the peer-to-peer connection between a first wireless interface of the first computing system and a second wireless interface of the second computing system.

(CRM3) At least one non-transitory, computer-readable medium may be encoded with instructions as described in paragraph (CRM1) or paragraph (CRM2), may be further encoded with additional instructions which, when executed by the at least one processor, further cause the at least one processor to determine the need for improved communication at least by determining that at least one performance parameter of the first connection is inadequate for at least one application executing under control of the first computing system.

(CRM4) At least one non-transitory, computer-readable medium may be encoded with instructions as described in paragraph (CRM3), wherein the at least one performance parameter of the first connection may include an available bandwidth of the first connection, and may be further encoded with additional instructions which, when executed by the at least one processor, further cause the at least one processor to determine that the at least one performance parameter of the first connection is inadequate at least by determining the available bandwidth of the first connection, and to determine that the available bandwidth of the first connection is below a threshold.

(CRM5) At least one non-transitory, computer-readable medium may be encoded with instructions as described in paragraph (CRM3) or paragraph (CRM4), wherein the at least one performance parameter of the first connection may include a latency of communications over the first connection, and the at least one non-transitory, computer-readable medium may be further encoded with additional instructions which, when executed by the at least one processor, further cause the at least one processor to determine that the at least one performance parameter of the first connection is inadequate at least by determining the latency of communications over the first connection, and determining that the latency of communications over the first connection exceeds a threshold.

(CRM6) At least one non-transitory, computer-readable medium may be encoded with instructions as described in any of paragraphs (CRM3) through (CRM5), wherein the at least one performance parameter of the first connection may include a loss of data sent via the first connection, and the at least one computer-readable medium may be further encoded with additional instructions which, when executed by the at least one processor, further cause the at least one processor to determine that the at least one performance parameter of the first connection is inadequate at least by determining the loss of data sent via the first connection, and determining that the loss of data sent via the first connection exceeds a threshold.

(CRM7) At least one non-transitory, computer-readable medium may be encoded with instructions as described in any of paragraphs (CRM3) through (CRM6), and may be further encoded with additional instructions which, when executed by the at least one processor, further cause the at least one processor to determine that at least one performance parameter of the first connection is inadequate at least by determining that the at least one application has been designated as critical.

(CRM8) At least one non-transitory, computer-readable medium may be encoded with instructions as described in any of paragraphs (CRM1) through (CRM7), and may be further encoded with additional instructions which, when executed by the at least one processor, further cause the at least one processor to determine, based at least in part on the indication, to establish the peer-to-peer connection with the second computing system, and to send, to the second computing system, a message requesting establishment of the peer-to-peer connection.

(CRM9) At least one non-transitory, computer-readable medium may be encoded with instructions as described in any of paragraphs (CRM1) through (CRM8), and may be further encoded with additional instructions which, when executed by the at least one processor, further cause the at least one processor to broadcast a message indicating the need for improved communication.

(CRM10) At least one non-transitory, computer-readable medium may be encoded with instructions as described in paragraph (CRM8) or paragraph (CRM9), wherein the at least one performance parameter of the second connection may include an available bandwidth of the second connection, and the at least one computer-readable medium may be further encoded with additional instructions which, when executed by the at least one processor, further cause the at least one processor to determine to establish the peer-to-peer connection at least by determining that the available bandwidth of the second connection is above a threshold.

(CRM11) At least one non-transitory, computer-readable medium may be encoded with instructions as described in any of paragraphs (CRM8) through (CRM10), wherein the at least one performance parameter of the second connection may include an available bandwidth of the second connection, and the at least one computer-readable medium may be further encoded with additional instructions which, when executed by the at least one processor, further cause the at least one processor to determine to establish the peer-to-peer connection at least by receiving, by the first computing system, a second message from a third device, the second message including an indication of available bandwidth of a third connection between the third device and the network, and determining that the available bandwidth of the second connection is greater than the available bandwidth of the third connection.

(CRM12) At least one non-transitory, computer-readable medium may be encoded with instructions as described in any of paragraphs (CRM8) through (CRM11), and may be further encoded with additional instructions which, when executed by the at least one processor, further cause the at least one processor to determine to establish the peer-to-peer connection at least by determining a strength of a first signal emitted by a wireless interface of the second computing system.

(CRM13) At least one non-transitory, computer-readable medium may be encoded with instructions as described in paragraph (CRM12), and may be further encoded with additional instructions which, when executed by the at least one processor, further cause the at least one processor to determine to establish the peer-to-peer connection at least by determining that the strength of the first signal is above a threshold.

(CRM14) At least one non-transitory, computer-readable medium may be encoded with instructions as described in paragraph (CRM12) or paragraph (CRM13), and may be further encoded with additional instructions which, when executed by the at least one processor, further cause the at least one processor to determine to establish the peer-to-peer connection at least by determining a strength of a second signal emitted by a wireless interface of a third device, and determining that the strength of the first signal is greater than the strength of the second signal.

(CRM15) At least one non-transitory, computer-readable medium may be encoded with instructions as described in any of paragraphs (CRM1) through (CRM14), and may be further encoded with additional instructions which, when executed by the at least one processor, further cause the at least one processor to send, to a third computing system, an authentication request identifying a user of the first computing system, to receive, from the third computing system and based at least in part on the authentication request, a token, and to encrypt communications sent over the peer-to-peer connection based at least in part on the token.

(CRM16) At least one non-transitory, computer-readable medium may be encoded with instructions as described in any of paragraphs (CRM1) through (CRM15), and may be further encoded with additional instructions which, when executed by the at least one processor, further cause the at least one processor to send, to a third computing system, an authentication request identifying a user of the first computing system, and to receive, from the third computing system and based at least in part on the authentication request, data enabling the first computing system to cause the second computing system to establish the communications channel.

(CRM17) At least one non-transitory, computer-readable medium may be encoded with instructions as described in any of paragraphs (CRM1) through (CRM16), and may be further encoded with additional instructions which, when executed by the at least one processor, further cause the at least one processor to establish, based at least in part on the indication, another peer-to-peer connection between the first computing system and the second computing system, and to communicate with the network via a combination of the first communications channel and a second communications channel that includes the other peer-to-peer connection and the second connection.

(CRM18) At least one non-transitory, computer-readable medium may be encoded with instructions as described in any of paragraphs (CRM1) through (CRM17), and may be further encoded with additional instructions which, when executed by the at least one processor, further cause the at least one processor to receive a second message from a fourth computing system, the second message including a second indication of at least one performance parameter of a third connection between the fourth computing system and the network, to establish, based at least in part on the second indication, another peer-to-peer connection between the first computing system and the fourth computing system, and to communicate with the network via a combination of the first communications channel and a second communications channel that includes the other peer-to-peer connection and the third connection.

(CRM19) At least one non-transitory, computer-readable medium may be encoded with instructions which, when executed by at least one processor included in a second computing system, cause the at least one processor to receive a first message broadcasted by a first computing system connected to a network via a first connection, the first message indicating a need for improved communication between the first computing system and the network, to determine at least one performance parameter of a second connection between the second computing system and the network, to send a second message to the first computing system, the second message including an indication of the at least one performance parameter of the second connection, to establish a peer-to-peer connection with the first computing system, to receive first data from the first computing system via the peer-to-peer connection, to send the first data to the network via the second connection, to receive second data from the network via the second connection, and to send the second data to the first computing system via the peer-to-peer connection.

(CRM20) At least one non-transitory, computer-readable medium may be encoded with instructions as described in paragraph (CRM19), and may be further encoded with additional instructions which, when executed by the at least one processor, further cause the at least one processor to send a third message from the first computing system, the third message indicating that the peer-to-peer connection is to be established.

(CRM21) At least one non-transitory, computer-readable medium may be encoded with instructions as described in paragraph (CRM19) or paragraph (CRM20), and may be further encoded with additional instructions which, when executed by the at least one processor, further cause the at least one processor to send to a third computing system, an authentication request identifying a user of the second computing system, to receive, from the third computing system and based at least in part on the authentication request, a token, to encrypt communications sent over the peer-to-peer connection based at least in part on the token, and to decrypt communications received via the peer-to-peer connection based at least in part on the token.

(CRM22) At least one non-transitory, computer-readable medium may be encoded with instructions as described in any of paragraphs (CRM19) through (CRM21), and may be further encoded with additional instructions which, when executed by the at least one processor, further cause the at least one processor to establish, while the peer-to-peer connection is established, another peer-to-peer connection with the first computing system, to receive third data from the first computing system via the other peer-to-peer connection, to send the third data to the network via the first connection, to receive fourth data from the network via the first connection, and to send the fourth data to the first computing system via the other peer-to-peer connection.

(CRM23) At least one non-transitory, computer-readable medium may be encoded with instructions as described in any of paragraphs (CRM19) through (CRM22), wherein the at least one performance parameter of the second connection includes available bandwidth of the second connection.

(CRM24) At least one non-transitory, computer-readable medium may be encoded with instructions as described in any of paragraphs (CRM19) through (CRM23), wherein the at least one performance parameter of the second connection includes data loss over the second connection.

(CRM25) At least one non-transitory, computer-readable medium may be encoded with instructions as described in any of paragraphs (CRM19) through (CRM24), wherein the at least one performance parameter of the second connection includes latency of communications over the second connection.

Having thus described several aspects of at least one embodiment, it is to be appreciated that various alterations, modifications, and improvements will readily occur to those skilled in the art. Such alterations, modifications, and improvements are intended to be part of this disclosure, and are intended to be within the spirit and scope of the disclosure. Accordingly, the foregoing description and drawings are by way of example only.

Various aspects of the present disclosure may be used alone, in combination, or in a variety of arrangements not specifically discussed in the embodiments described in the foregoing and is therefore not limited in this application to the details and arrangement of components set forth in the foregoing description or illustrated in the drawings. For example, aspects described in one embodiment may be combined in any manner with aspects described in other embodiments.

Also, the disclosed aspects may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc. in the claims to modify a claim element does not by itself connote any priority, precedence or order of one claim element over another or the temporal order in which acts of a method are performed, but are used merely as labels to distinguish one claimed element having a certain name from another element having a same name (but for use of the ordinal term) to distinguish the claim elements.

Also, the phraseology and terminology used herein is used for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method, comprising:
   determining, by a first client device, a need for improved communication between the first client device and a network, the first client device connected to the network via a first connection;
   broadcasting, by the first client device, a first message indicating the need for improved communication;
   receiving, by the first client device and in response to broadcasting the first message, second and third messages from second and third client devices, respectively, the second message including a first indication of a first available bandwidth of a second connection between the second client device and the network, and the third message including a second indication of a second available bandwidth of a third connection between the third client device and the network;
   determining, based at least in part on the first indication and the second indication, that the first available bandwidth of the second connection is greater than the second available bandwidth of the third connection;
   establishing, by the first client device and based at least in part on the first available bandwidth of the second connection being greater than the second available bandwidth of the third connection, a first peer-to-peer connection between the first client device and the second client device; and
   communicating, by the first client device, with the network via a communications channel that includes the first peer-to-peer connection and the second connection between the second client device and the network.

2. The method of claim 1, further comprising:
   based at least in part on the first available bandwidth of the second connection being greater than the second available bandwidth of the third connection, sending, from the first client device to the second client device, a message requesting establishment of the first peer-to-peer connection.

3. The method of claim 1, further comprising:
   determining a first priority status assigned to the first client device; and
   determining a second priority status assigned to the second client device;
   wherein establishing the first peer-to-peer connection is further based at least in part on the first priority status and the second priority status.

4. The method of claim 1, further comprising:
   determining that the second available bandwidth of the second connection is above a threshold;
   wherein establishing the first peer-to-peer connection is further based at least in part on the second available bandwidth of the second connection being above the threshold.

5. The method of claim 1, further comprising:
   determining a strength of a first signal emitted by a wireless interface of the second client device; and
   determining that the strength of the first signal is above a threshold;
   wherein establishing the first peer-to-peer connection is further based at least in part on the strength of the first signal being above the threshold.

6. The method of claim 1, further comprising:
   determining a strength of a first signal emitted by a wireless interface of the second client device;
   determining a strength of a second signal emitted by a wireless interface of the third client device; and
   determining that the strength of the first signal is greater than the strength of the second signal;
   wherein establishing the first peer-to-peer connection is further based at least in part on the strength of the first signal being greater than the strength of the second signal.

7. The method of claim 1, further comprising:
   sending, to a computing system, an authentication request identifying a user of the first client device;
   receiving, from the computing system and based at least in part on the authentication request, a token; and
   encrypting communications sent over the first peer-to-peer connection based at least in part on the token.

8. The method of claim 1, further comprising:
   establishing a second peer-to-peer connection between the first client device and at least one other device;
   wherein communicating with the network further comprises communicating with the network via a bonded communications channel that includes both the first peer-to-peer connection and the second peer-to-peer connection.

9. The method of claim 1, further comprising:
   determining, by the first client device, that the first client device accesses at least one application designated as being of a first level of importance relative to other applications;
   wherein establishing the first peer-to-peer connection is further based at least in part on the at least one application being designated as of the first level of importance.

10. The method of claim 9, wherein determining the need for improved communication further comprises:
    determining that at least one performance parameter of the first connection is inadequate for the at least one application.

11. The method of claim 10, wherein the at least one performance parameter of the first connection includes a third available bandwidth of the first connection, and determining that the at least one performance parameter of the first connection is inadequate further comprises:
    determining the third available bandwidth of the first connection; and determining that the third available bandwidth of the first connection is below a threshold.

12. At least one non-transitory computer-readable medium encoded with instructions which, when executed by at least one processor included in a first client device connected to a network via a first connection, cause the first client device to:
   determine a need for improved communication between the first client device and the network;
   broadcast a first message indicating the need for improved communication;
   receive, in response to broadcasting the first message, second and third messages from second and third client devices, respectively, the second message including a first indication of a first available bandwidth of a second connection between the second client device and the network, and the third message including a second indication of a second available bandwidth of a third connection between the third client device and the network;
   determine, based at least in part on the first indication and the second indication, that the first available bandwidth of the second connection is greater than the second available bandwidth of the third connection;
   establish, based at least in part on the first available bandwidth of the second connection being greater than the second available bandwidth of the third connection, a first peer-to-peer connection between the first client device and the second client device; and
   communicate with the network via a communications channel that includes the first peer-to-peer connection and the second connection between the second client device and the network.

13. The at least one non-transitory computer-readable medium of claim 12, encoded with additional instructions which, when executed by at least one processor, further cause the first client device to:
   based at least in part on the first available bandwidth of the second connection being greater than the second available bandwidth of the third connection, send, to the second client device, a message requesting establishment of the first peer-to-peer connection.

14. The at least one non-transitory computer-readable medium of claim 12, encoded with additional instructions which, when executed by at least one processor, further cause the first client device to:
   determine a strength of a first signal emitted by a wireless interface of the second client device;
   determine a strength of a second signal emitted by a wireless interface of the third client device;
   determine that the strength of the first signal is greater than the strength of the second signal; and
   establish the first peer-to-peer connection further based at least in part on the strength of the first signal being greater than the strength of the second signal.

15. The at least one non-transitory computer-readable medium of claim 12, encoded with additional instructions which, when executed by at least one processor, further cause the first client device to:
   send, to a computing system, an authentication request identifying a user of the first client device;
   receive, from the computing system and based at least in part on the authentication request, a token; and
   encrypt communications sent over the first peer-to-peer connection based at least in part on the token.

16. The at least one non-transitory computer-readable medium of claim 12, encoded with additional instructions which, when executed by at least one processor, further cause the first client device to:
   determine that the first client device accesses at least one application designated as being of a first level of importance relative to other applications; and
   establish the first peer-to-peer connection further based at least in part on the at least one application being designated as of the first level of importance.

17. The at least one non-transitory computer-readable medium of claim 16, encoded with additional instructions which, when executed by at least one processor, further cause the first client device to determine the need for improved communication at least by:
   determining that at least one performance parameter of the first connection is inadequate for the at least one application.

18. The at least one non-transitory computer-readable medium of claim 17, wherein the at least one performance parameter of the first connection includes a third available bandwidth of the first connection, and the at least one non-transitory computer-readable medium is encoded with additional instructions which, when executed by at least one processor, further cause the first client device to determine that the at least one performance parameter of the first connection is inadequate at least in part by:
   determining the third available bandwidth of the first connection; and
   determining that the third available bandwidth of the first connection is below a threshold.

19. The at least one non-transitory computer-readable medium of claim 12, further encoded with additional instructions which, when executed by at least one processor, further cause the first client device to:
   determine a first priority status assigned to the first client device;
   determine a second priority status assigned to the second client device; and
   establish the first peer-to-peer connection further based at least in part on the first priority status and the second priority status.

20. The at least one non-transitory computer-readable medium of claim 12, further encoded with additional instructions which, when executed by at least one processor, further cause the first client device to:
   determine that the second available bandwidth of the second connection is above a threshold; and
   establish the first peer-to-peer connection further based at least in part on the second available bandwidth of the second connection being above the threshold.

21. The at least one non-transitory computer-readable medium of claim 12, further encoded with additional instructions which, when executed by at least one processor, further cause the first client device to:
   determine a strength of a first signal emitted by a wireless interface of the second client device;
   determine that the strength of the first signal is above a threshold; and
   establish the first peer-to-peer connection further based at least in part on the strength of the first signal being above the threshold.

22. The at least one non-transitory computer-readable medium of claim 12, further encoded with additional instructions which, when executed by at least one processor, further cause the first client device to:
   send, to a computing system, an authentication request identifying a user of the first client device;

receive, from the computing system and based at least in part on the authentication request, a token; and encrypt communications sent over the first peer-to-peer connection based at least in part on the token.

23. The at least one non-transitory computer-readable medium of claim 12, further encoded with additional instructions which, when executed by at least one processor, further cause the first client device to:

establish a second peer-to-peer connection between the first client device and at least one other device; and communicate with the network at least in part by communicating with the network via a bonded communications channel that includes both the first peer-to-peer connection and the second peer-to-peer connection.

24. A first client device, comprising:

at least one processor; and at least one computer-readable medium encoded with instructions which, when executed by at least one processor, cause the first client device to:

determine a need for improved communication between the first client device and a network to which the first client device is connected via a first connection, broadcast a first message indicating the need for improved communication, receive, in response to broadcasting the first message, second and third messages from second and third client devices, respectively, the second message including a first indication of a first available bandwidth of a second connection between the second client device and the network, and the third message including a second indication of a second available bandwidth of a third connection between the third client device and the network, determine, based at least in part on the first indication and the second indication, that the first available bandwidth of the second connection is greater than the second available bandwidth of the third connection, establish, based at least in part on the first available bandwidth of the second connection being greater than the second available bandwidth of the third connection, a first peer-to-peer connection between the first client device and the second client device, and communicate with the network via a communications channel that includes the first peer-to-peer connection and the second connection between the second client device and the network.

25. The first client device of claim 24, wherein the at least one computer-readable medium is further encoded with additional instructions which, when executed by at least one processor, further cause the first client device to:

based at least in part on the first available bandwidth of the second connection being greater than the second available bandwidth of the third connection, send, to the second client device, a message requesting establishment of the first peer-to-peer connection.

26. The first client device of claim 24, wherein the at least one computer-readable medium is further encoded with additional instructions which, when executed by at least one processor, further cause the first client device to:

determine that the first client device accesses at least one application designated as being of a first level of importance relative to other applications; and establish the first peer-to-peer connection further based at least in part on the at least one application being designated as of the first level of importance.

27. The first client device of claim 26, wherein the at least one computer-readable medium is further encoded with additional instructions which, when executed by at least one processor, further cause the first client device to determine the need for improved communication at least by:

determining that at least one performance parameter of the first connection is inadequate for the at least one application.

\* \* \* \* \*